US012783103B2

(12) United States Patent
Sun et al.

(10) Patent No.: US 12,783,103 B2
(45) Date of Patent: Nov. 3, 2026

(54) DEVICE CONNECTION ESTABLISHMENT METHOD AND TERMINAL DEVICE

(71) Applicant: Honor Device Co., Ltd., Shenzhen (CN)

(72) Inventors: Ke Sun, Shenzhen (CN); Haotian Pang, Shenzhen (CN); Kai Qian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 225 days.

(21) Appl. No.: 18/719,714

(22) PCT Filed: May 6, 2023

(86) PCT No.: PCT/CN2023/092421
§ 371 (c)(1),
(2) Date: Jun. 13, 2024

(87) PCT Pub. No.: WO2023/241257
PCT Pub. Date: Dec. 21, 2023

(65) Prior Publication Data

US 2025/0138713 A1 May 1, 2025

(30) Foreign Application Priority Data

Jun. 13, 2022 (CN) ......................... 202210663211.8

(51) Int. Cl.
*G06F 3/0482* (2013.01)
*G06F 3/033* (2013.01)
*G06F 3/0486* (2013.01)
*G06F 3/14* (2006.01)
(Continued)

(52) U.S. Cl.
CPC ............ *G06F 3/0482* (2013.01); *G06F 3/033* (2013.01); *G06F 3/0486* (2013.01);
(Continued)

(58) Field of Classification Search
CPC ...... G06F 3/0482; G06F 3/033; G06F 3/0486; G06F 3/1423; G06F 3/04817; H04W 4/80; H04W 8/005; H04W 76/14
See application file for complete search history.

(56) References Cited

U.S. PATENT DOCUMENTS 12,069,551 B2 8/2024 Liu et al.
2013/0318451 A1 11/2013 Wu et al.
(Continued)

FOREIGN PATENT DOCUMENTS

CN 103246373 A 8/2013
CN 103425408 A 12/2013
(Continued)

*Primary Examiner* — Nicholas Ulrich
(74) *Attorney, Agent, or Firm* — Leydig, Voit & Mayer, Ltd.

(57) ABSTRACT

Disclosed are a device connection establishment method and a terminal device related to the field of terminal technologies. In response to a first operation on an identifier of a second terminal in second identifiers of discovered devices in a second area, the first terminal may establish a short-range communication connection with the second terminal, and move the identifier of the second terminal from the second area to a first area of a first identifier of the first terminal. The first terminal and the second terminal enter a preset mode. In the preset mode, the first terminal moves, in response to a second operation of a user, a cursor corresponding to an input device to an interface of the second terminal. In response to a third operation, the second terminal performs a function corresponding to the third operation. In this way, user operations are convenient and fast, and experience is good.

19 Claims, 20 Drawing Sheets

(51) Int. Cl.

| | |
|---|---|
| ***H04W 4/80*** | (2018.01) |
| ***H04W 8/00*** | (2009.01) |
| ***H04W 76/14*** | (2018.01) |
| *G06F 3/04817* | (2022.01) |

(52) U.S. Cl.

CPC ............ *G06F 3/1423* (2013.01); *H04W 4/80* (2018.02); *H04W 8/005* (2013.01); *H04W 76/14* (2018.02); *G06F 3/04817* (2013.01)

(56) References Cited

U.S. PATENT DOCUMENTS

| | | | | |
|---|---|---|---|---|
| 2014/0187164 | A1 | 7/2014 | Yang et al. | |
| 2014/0317530 | A1 | 10/2014 | Chang et al. | |
| 2016/0299676 | A1 | 10/2016 | Yoon et al. | |
| 2017/0171035 | A1* | 6/2017 | Lu | G06F 3/0486 |
| 2022/0141792 | A1* | 5/2022 | Holyoake | G01S 5/0284<br>455/456.1 |
| 2023/0122934 | A1* | 4/2023 | Kwon | G06F 3/14<br>345/634 |
| 2024/0045557 | A1 | 2/2024 | Xiong et al. | |
| 2024/0220095 | A1* | 7/2024 | Ye | G06F 3/04817 |

FOREIGN PATENT DOCUMENTS

| | | | |
|---|---|---|---|
| CN | 103905092 | A | 7/2014 |
| CN | 110191450 | A | 8/2019 |
| CN | 114201103 | A | 3/2022 |
| CN | 114579016 | A | 6/2022 |
| EP | 4235371 | A1 | 8/2023 |
| WO | 2022111690 | A1 | 6/2022 |

* cited by examiner (a)

(b)

DEVICE CONNECTION ESTABLISHMENT METHOD AND TERMINAL DEVICE

CROSS-REFERENCE TO RELATED APPLICATIONS

This application is a National Stage of International Application No. PCT/CN2023/092421, filed on May 6, 2023, which claims priority to Chinese Patent Application No. 202210663211.8, filed on Jun. 13, 2022, both of which are hereby incorporated by reference in their entireties.

TECHNICAL FIELD

This application relates to the field of terminal technologies, and in particular, to a device connection establishment method and a terminal device.

BACKGROUND

With the development of terminal technologies, terminal devices have become a part of people's work and life. At present, some terminal devices can be connected with input devices such as mouses and keyboards to help users easily enter operation instructions.

When a first terminal is connected to input devices, for example, a mouse and a keyboard, the first terminal establishes a communication connection with a second terminal by setting the mouse or the keyboard connected to the first terminal, that is, the first terminal and the second terminal share the input device, for example, the mouse or the keyboard, so that it may be convenient to enter an operation instruction on the second terminal. However, a setting process and a connection interaction manner in the related technology are complicated, and operation efficiency is low.

SUMMARY

This application provides a device connection establishment method and a terminal device. Operation steps for a user to trigger a first terminal to enter a preset mode are convenient, simple, and efficient.

According to a first aspect, this application provides a device connection establishment method, applied to a first terminal and a second terminal. The first terminal is connected with an input device configured for entering a control instruction. The method provided in this application includes: The first terminal displays a first window, where the first window is a first interface of a first application, and the first interface includes a first control; in response to a trigger operation on the first control, the first terminal performs device discovery, and displays a second interface in the first window, where the second interface includes a first identifier of the first terminal, a first area is around the first identifier of the first terminal, and second identifiers of discovered devices are displayed in a second area around the first identifier of the first terminal; in response to a first operation on an identifier of a second terminal in the second identifiers, the first terminal establishes a short-range communication connection with the second terminal, and moves the identifier of the second terminal from the second area to the first area; the first terminal and the second terminal enter a preset mode, and in the preset mode, the first terminal moves, in response to a second operation of a user, a cursor corresponding to an input device to an interface of the second terminal; receiving a third operation of the user on the input device; and in response to the third operation, the second terminal performs a function corresponding to the third operation.

In the device connection establishment method provided in this application, the first terminal may display the second identifiers of the discovered devices in the second area. Further, in response to the first operation on the identifier of the second terminal in the second identifiers, the first terminal may establish the short-range communication connection with the second terminal, and move the identifier of the second terminal from the second area to the first area of the first identifier of the first terminal. When the identifier of the second terminal is moved from the second area to the first area of the first identifier of the first terminal, the user may be indicated to establish the short-range communication connection between the first terminal and the second terminal. The discovered device is displayed around the identifier of the first terminal, and the discovered device is moved from the second area to the first area after the connection is established, so that a connection relationship between the first terminal and another device can be visually displayed to the user. In addition, a connection process can be implemented by operating the identifier of the discovered device. Compared with the related technology in which two devices need to be set separately, operations are more convenient and fast, and experience is good.

In a possible embodiment, the first area includes a first subarea and a second subarea, the first subarea is located on a first side of the first identifier, the second subarea is located on a second side of the first identifier, and the moving the identifier of the second terminal from the second area to the first area includes: moving the identifier of the second terminal from the second area to the first subarea or the second subarea.

In a possible embodiment, the moving the identifier of the second terminal from the second area to the first subarea or the second subarea includes: When recognizing that the second terminal is located on a second side of the first terminal, first terminal moves the identifier of the second terminal from the second area to the second subarea. The second operation is an operation of moving the cursor corresponding to the input device to a second edge of an interface of the first terminal by the user.

In this way, a direction of the identifier of the second terminal relative to the first identifier of the first terminal is the same as a direction of the second terminal relative to the first terminal in reality. This can make display content on the second interface closer to the real world, improve user experience, and facilitate the user to move the cursor corresponding to the input device to the interface of the second terminal.

In a possible embodiment, the moving the identifier of the second terminal from the second area to the first subarea or the second subarea includes: When recognizing that the second terminal is located on a first side of the first terminal, first terminal moves the identifier of the second terminal from the second area to the first subarea. The second operation is an operation of moving the cursor corresponding to the input device to a first edge of an interface of the first terminal by the user.

Similarly, the direction of the identifier of the second terminal relative to the first identifier of the first terminal is the same as the direction of the second terminal relative to the first terminal in reality. In this way, the display content in the second interface can be closer to the real world. This improves user experience, and facilitates the user to move the cursor corresponding to the input device to the interface of the second terminal.

In a possible embodiment, after that the first terminal moves, in response to a second operation of a user, a cursor corresponding to an input device to an interface of the second terminal, the method provided in this application further includes: The first terminal moves the identifier of the second terminal in response to an operation of moving the identifier of the second terminal to the second side; the first terminal displays the identifier of the second terminal in the second subarea when detecting that the second terminal moves to the second side; and the first terminal moves the cursor to the interface of the second terminal in response to the operation of moving the cursor corresponding to the input device to the second edge of the interface of the first terminal by the user.

In this way, when the second terminal moves from the first side of the first terminal to the second side in the real world, the first terminal may move the identifier of the second terminal from the first subarea to the second subarea in response to the operation of the user. In this way, the display content in the second interface can be closer to the real world through simple operations. This improves user experience, and facilitates the user to move the cursor corresponding to the input device to the interface of the second terminal.

In a possible embodiment, after that the first terminal moves, in response to a second operation of a user, a cursor corresponding to an input device to an interface of the second terminal, the method provided in this application further includes: The first terminal moves an identifier of a third terminal in response to an operation of moving the identifier of the third terminal in the second identifiers to a direction of the first side; the first terminal establishes a short-range communication connection with the third terminal when detecting that the identifier of the third terminal is moved to the first side; the first terminal displays the identifier of the third terminal in the first subarea, and moves the identifier of the second terminal to the second subarea for display; and the first terminal moves the cursor to an interface of the third terminal in response to the operation of moving the cursor corresponding to the input device to the first edge of the interface of the first terminal by the user.

In this way, in addition to a function of sharing the input device with the second terminal, the first terminal may further have a function of sharing the input device with the third terminal.

In a possible embodiment, after that the first terminal moves the cursor to an interface of the third terminal in response to the operation of moving the cursor corresponding to the input device to the first edge of the interface of the first terminal by the user, the method provided in this application further includes: The first terminal moves the identifier of the third terminal in response to an operation of moving the identifier of the third terminal to a direction of the second side; when the first terminal detects that the identifier of the third terminal is moved to the second side, the first terminal displays the identifier of the third terminal in the second subarea, and moves the identifier of the second terminal from the second subarea to the first subarea; and the first terminal moves the cursor to an interface of the third terminal in response to the operation of moving the cursor corresponding to the input device to the second edge of the interface of the first terminal by the user.

It should be noted that, in a case that the first terminal has the functions of sharing the input device with the second terminal and the third terminal, if the third terminal is moved from the first side of the first terminal to the second side in the real world, the first terminal may move the identifier of the third terminal from the first side of the first identifier of the first terminal to the second side in response to an operation of the user on the identifier of the third terminal. In this way, the display content in the second interface can be closer to the real world. This improves user experience, and facilitates the user to move the cursor corresponding to the input device to the interface of the third terminal.

In a possible embodiment, after that the first terminal moves the cursor to an interface of the third terminal in response to the operation of moving the cursor corresponding to the input device to the second edge of the interface of the first terminal by the user, the method provided in this application further includes: In response to the first operation on an identifier of a fourth terminal in the second identifiers, if the first terminal recognizes that the fourth terminal is located on the first side of the first terminal, the first terminal disconnects the short-range communication connection with the second terminal, and establishes a short-range communication connection with the fourth terminal; the first terminal moves the identifier of the second terminal from the first subarea to the second area, and moves the identifier of the fourth terminal from the second area to the first subarea; and the first terminal moves the cursor to an interface of the fourth terminal in response to an operation of moving the cursor corresponding to the input device on the first interface to a second side of the fourth terminal by the user.

It should be noted that, when the first area includes only the first subarea and the second subarea, the first terminal allows two devices to establish a short-range communication connection. On the basis of connecting the first terminal to the second terminal and the third terminal, when the first terminal responds to the first operation on the identifier of the fourth terminal in the second identifiers, it indicates that the user needs to establish a short-range communication connection between the fourth terminal and the first terminal. In this case, if the first terminal recognizes that the fourth terminal is located on the first side of the first terminal (namely, the side at which the second terminal is located), the first terminal disconnects the short-range communication connection with the second terminal, and establishes the short-range communication connection with the fourth terminal. In addition, the first terminal moves the identifier of the second terminal from the first subarea to the second area, and moves the identifier of the fourth terminal from the second area to the first subarea, to indicate, to the user, that the first terminal disconnects the short-range communication connection with the second terminal, and establishes the short-range communication connection with the fourth terminal. In this case, the first terminal has a function of sharing the input device with the fourth terminal.

In a possible embodiment, a display state of the identifier of the second terminal located in the second area is different from a display state of the identifier of the second terminal located in the first subarea or the second subarea. In this way, the user can further distinguish whether the second terminal establishes the short-range communication connection with the first terminal based on the display state of the identifier of the second terminal more clearly.

In a possible embodiment, that second identifiers of discovered devices are displayed in a second area around the first identifier of the first terminal includes: The first terminal recognizes a direction of each discovered device relative to the first terminal; and the first terminal displays the second identifiers of the discovered devices in the second area around the first identifier of the first terminal, where a direction of each second identifier relative to the first identifier of the first terminal is the same as the direction of each device relative to the first terminal.

In this way, a direction of the identifier of the discovered device relative to the first identifier of the first terminal is the same as a direction of the discovered device relative to the first terminal in reality. In this way, the display content in the second interface can be closer to the real world. This improves user experience.

In a possible embodiment, after that the first terminal displays the second identifiers of the discovered devices in the second area around the first identifier of the first terminal, the method provided in this application further includes: when the first terminal detects a change of the direction of one of the devices relative to the first terminal, the first terminal adjusts a position of the second identifier of one of the devices on the first interface, where a direction of the adjusted second identifier of one of the devices relative to the first identifier of the first terminal is the same as the direction of one of the devices relative to the first terminal.

In this way, even if the direction of one of the devices relative to the first terminal changes in the real world, the direction of the identifier of the device relative to the first identifier of the first terminal may be the same as the direction of the first terminal in reality. In this way, the display content in the second interface can be closer to the real world. This improves user experience.

In a possible embodiment, the second area includes a plurality of third subareas, and that second identifiers of discovered devices are displayed in a second area around the first identifier of the first terminal includes: The first terminal recognizes a direction of each discovered device relative to the first terminal; and the first terminal determines an arrangement manner of the second identifiers of the discovered devices based on the direction of each discovered device relative to the first terminal, a direction of each third subarea relative to the first identifier of the first terminal, a specified priority of each device, and a specified priority of each third subarea; and the first terminal displays the second identifiers of the discovered devices in the plurality of third subareas based on the determined arrangement manner of the second identifiers.

In this way, a second identifier of a device with a higher priority can be arranged at a position that is more convenient for the user to browse and operate.

In a possible embodiment, an arrangement manner of the second identifiers of the discovered devices in the second area is: random arrangement; or arrangement based on a priority of each device; or arrangement based on a priority of each third subarea, where the second area includes a plurality of third subareas.

In a possible embodiment, a quantity of the discovered devices is greater than a first quantity, and that second identifiers of discovered devices are displayed in a second area around the first identifier of the first terminal includes: When he quantity of discovered devices is greater than the first quantity, the first terminal selects the first quantity of devices from the discovered devices; and displaying second identifiers of the first quantity of selected devices in the second area around the first identifier of the first terminal.

In a possible embodiment, a strategy for selecting the first quantity of devices may be: randomly selecting the first quantity of devices from the discovered devices; or selecting the first quantity of devices that is discovered in an earlier time sequence from the discovered devices; or when a quantity of devices that have been connected in the discovered devices is greater than or equal to the first quantity, selecting the first quantity of devices from the devices that have been connected.

It should be understood that the second terminal that is last connected to the first terminal at an earliest moment or the second terminal that is connected to the first terminal the most times is a device to which the user pays more attention. In this way, a position of the second terminal is sorted based on the determined priority. This is more convenient for the user to operate.

In a possible embodiment, the first interface further includes a second control, the second control is used to indicate each of second identifiers of a next group of devices, and after the displaying second identifiers of the first quantity of selected devices in the second area around the first identifier of the first terminal, the method provided in this application further includes: In response to a trigger operation on the second control, the first terminal determines whether a quantity of second identifiers of unselected devices in the discovered device is less than the first quantity; when the quantity of unselected devices is greater than the first quantity, the first terminal reselects the first quantity of devices from the unselected devices; displaying second identifiers of the first quantity of reselected devices in the second area around the first identifier of the first terminal; and when the quantity of unselected devices is less than or equal to the first quantity, the first terminal displays the second identifiers of the unselected devices in the second area of the first terminal around the first identifier of the first terminal.

In this way, the second identifier that has not been displayed can be displayed in the second interface, to facilitate the user to browse and operate.

In a possible embodiment, after the moving the identifier of the second terminal from the second area to the first area, the method provided in this application further includes: In response to a fourth operation on the identifier of the second terminal located in the first area, the first terminal moves the identifier of the second terminal from the first area to the second area for display; and the first terminal disconnects the short-range communication connection with the second terminal.

In a possible embodiment, the fourth operation is an operation of moving the identifier of the second terminal out of the first area; or the fourth operation is a click operation on the identifier of the second terminal located in the first area; or the identifier of the second terminal carries a third control, and the fourth operation is a click operation on the third control.

In a possible embodiment, the input device is a keyboard, a mouse, or a touchpad.

According to a second aspect, an embodiment of this application provides a terminal device, including a processor and a memory. The memory is configured to store code instructions. The processor is configured to run the code instructions, to enable the terminal device to perform the method performed by the first terminal or the second terminal according to the first aspect or any one of implementations of the first aspect.

According to a third aspect, an embodiment of this application provides a computer-readable storage medium. The computer-readable storage medium stores instructions. When the instructions are executed, a computer is enabled to perform the method performed by the first terminal or the second terminal according to the first aspect or any one of implementations of the first aspect.

According to a fourth aspect, a computer program product is provided, including a computer program. When the computer program is run, a computer is enabled to perform the method performed by the first terminal or the second terminal according to the first aspect or any one of implementations of the first aspect.

It should be understood that the second aspect to the fourth aspect of this application correspond to the technical solution of the first aspect of this application, and the beneficial effects obtained by each aspect and the corresponding feasible implementations are similar. Details are not described herein again.

DESCRIPTION OF EMBODIMENTS

For ease of describing the technical solutions in embodiments of this application clearly, in embodiments of this application, the words such as "first" and "second" are used to distinguish same or similar items with a basically same function and role. For example, a first value and a second value are merely used to distinguish between different values, and are not intended to limit a sequence thereof. A person skilled in the art may understand that, the words such as "first" and "second" do not limit a quantity and an execution order, and the words such as "first" and "second" are not limited to be necessarily different.

It should be noted that, in this application, the words such as "exemplarily" or "for example" is used to represent giving an example, an illustration, or a description. Any embodiment or design scheme described as "exemplarily" or "for example" in embodiments of this application should not be explained as being more preferable or more advantageous than another embodiment or design scheme. Exactly, use of the words such as "exemplarily" or "for example" is intended to present a related concept in a specific manner.

In this application, "at least one" means one or more and "a plurality of" means two or more. The word "and/or" describes an association relationship for describing associated objects and represents that three relationships may exist. For example, A and/or B may represent: only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent: a, b, c, a-b, a-c, b-c, or a-b-c, where a, b, and c may be single or multiple.

At present, with the development of terminal technologies, terminal devices have become a part of people's work and life. At present, some terminal devices can be connected with input devices such as mouses, keyboards, and touchpads to help users easily input operation instructions.

When a first terminal is connected to an input device, for example, a mouse or a keyboard, if a user wants to share a function of the input device, for example, the mouse or the keyboard, with a second terminal, a short-range communication connection may be established between the first terminal and the second terminal, to enable the first terminal to enter an operation sharing mode. When the first terminal is in the operation sharing mode, the user can use the mouse and the keyboard to easily input a control instruction or data on the second terminal.

Figure 1:
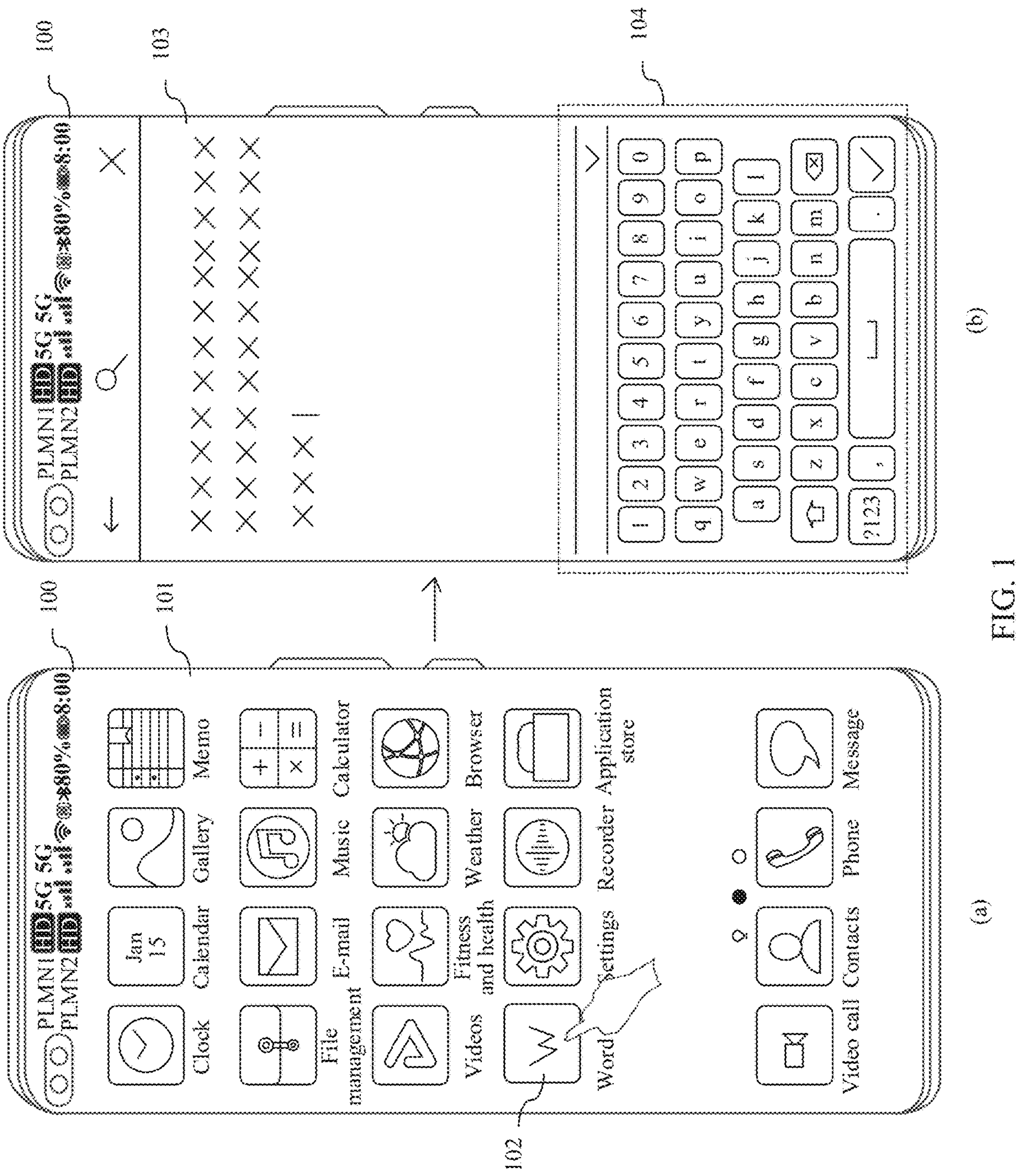
FIG. 1 is a schematic interface diagram of editing text data on a word editing interface of a mobile phone.

For example, when the first terminal is a laptop computer and the second terminal is a mobile phone, as shown in (a) in FIG. 1, the mobile phone 100 may display a desktop 101, where the desktop 101 includes a Word icon 102. As shown in (b) in FIG. 1, the mobile phone 100 may display an editing interface 103 of Word in response to a trigger operation on the Word icon 102. The mobile phone 100 may display an interface 104 of an input method application in response to tapping an editing area on the editing interface 103. In this way, the user can input data through the interface 104 of the input method application, to edit a word document.

In a related technology, the mouse or the keyboard connected to the laptop computer is set to establish a connection to the mobile phone at the same time, that is, the mobile phone and the laptop computer share the mouse or the keyboard, to implement convenience of editing the word document on the mobile phone. However, a setting process and a connection interaction manner in the related technology is complicated.

In view of this, this application provides an interaction device connection establishment method. In response to a trigger operation on a first control on a first interface in a first window, a first terminal performs device discovery, and displays a second interface in the first window. The second interface includes a first identifier of the first terminal, a first area is around the first identifier of the first terminal, and second identifiers of discovered devices are displayed in a second area around the first identifier of the first terminal. In response to a first operation on an identifier of a second terminal in the second identifiers, the first terminal establishes a short-range communication connection with the second terminal, and moves the identifier of the second terminal from the second area to the first area.

In this way, the first terminal and the second terminal enter a preset mode, and in the preset mode, the first terminal moves, in response to a second operation of a user, a cursor corresponding to an input device to an interface of the second terminal, and receives a third operation of the user on the input device. In response to the third operation, the second terminal performs a function corresponding to the third operation. That is, the first terminal can share the input device of the first terminal with the second terminal. Operations are convenient and fast.

It may be understood that the first terminal may be a device, for example, a laptop computer or a desktop computer connected to an input device, for example, a mouse, a keyboard, and/or a touchpad. Embodiments of this application impose no limitation on a specific technology and a specific device form used by the first terminal.

To better understand embodiments of this application, the following describes a structure of the first terminal in embodiments of this application. For example, FIG. 2 is a schematic diagram of the structure of the first terminal according to an embodiment of this application.

Figure 2:
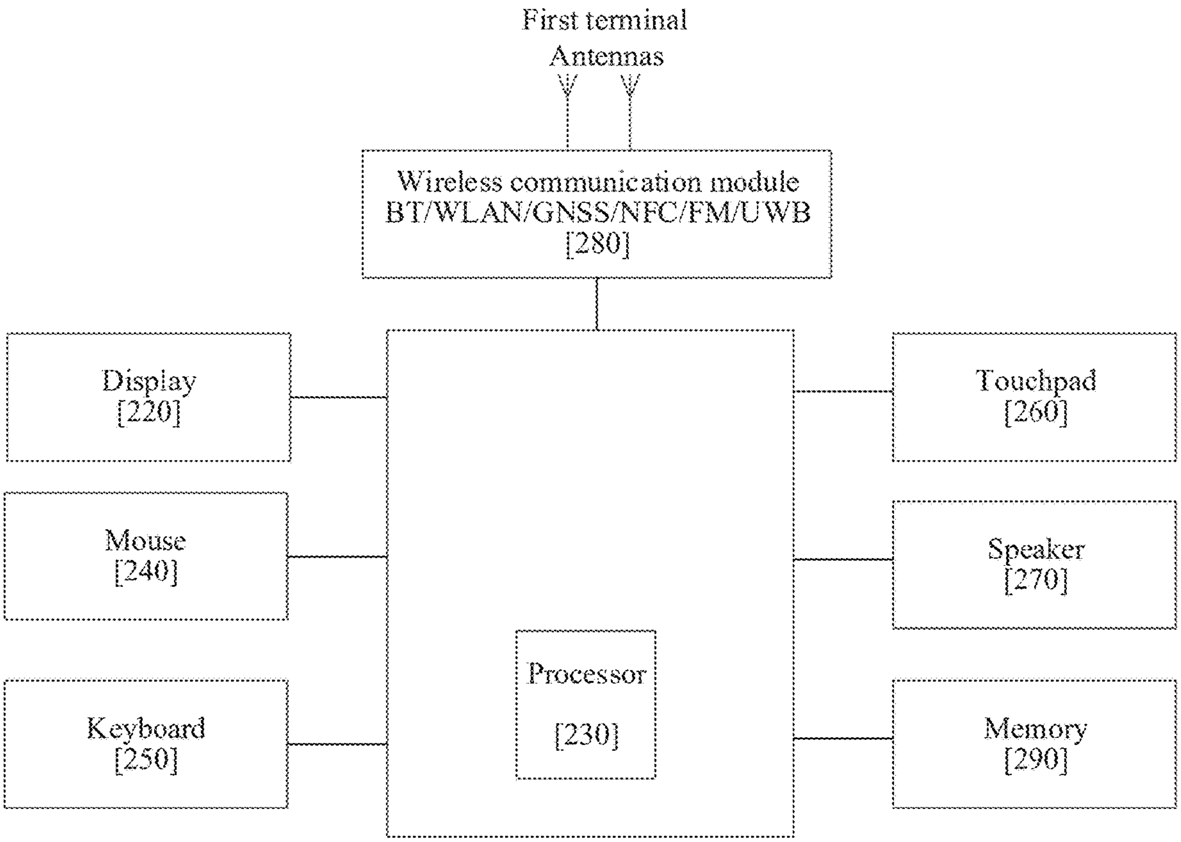
FIG. 2 is a schematic diagram of a hardware system architecture of a terminal device according to an embodiment of this application.

FIG. 2 is a schematic diagram of a hardware structure of the first terminal according to an embodiment of the present application. Refer to FIG. 2. The first terminal may include a plurality of subsystems. These subsystems cooperate to perform, coordinate, or monitor one or more operations or functions of the first terminal. The first terminal includes a display 220, a processor 230, a mouse 240, a keyboard 250, a touchpad 260, a speaker 270, a wireless communication module 280, and a memory 290.

A wireless communication function of the first terminal may be implemented by using the antenna, the wireless communication module 280, the modem processor, the baseband processor, and the like. The antenna may be configured to transmit and receive electromagnetic wave signals. Each antenna in the first terminal may be configured to cover one or more communication frequency bands. Different antennas may be further multiplexed, to improve antenna utilization.

The wireless communication module 280 may provide a solution for wireless communication including wireless local area networks (WLANs) (such as a wireless fidelity (Wi-Fi) network), Bluetooth (BT), a global navigation satellite system (GNSS), frequency modulation (FM), and the like to be applied to the first terminal.

The processor 230 may be implemented as any electronic device capable of processing, receiving, or sending data or instructions. For example, the processor may be a microprocessor, a central processing unit, an application-specific integrated circuit, a field programmable gate array, a digital signal processor, an analog circuit, a digital circuit, or a combination of these devices. The processor may be a single-threaded or multi-threaded processor. The processor may be a single-core or multi-core processor.

During use, the processor 230 may be configured to access a memory in which instructions are stored. The instructions may be configured to enable the processor to perform, coordinate, or monitor one or more operations or functions of the first terminal.

The display 220 may be communicatively coupled to the processor 230. The processor 230 may use the display 220 to present information to a user. In many cases, the processor 230 uses the display 220 to present an interface with which the user can interact.

The mouse 240 is connected to the first terminal through a USB interface of the first terminal, and can also communicate with the first terminal through the wireless communication module 280. The first terminal can move a position of a cursor on the display 220 in response to an operation of moving the mouse 240 by the user.

The mouse 240 can move a position of a cursor on the display 220 in response to a moving operation of the user.

The keyboard 250 can be integrated into the first terminal, or connected to the first terminal through the USB interface of the first terminal, and can also communicate with the first terminal through the wireless communication module 280. In response to a trigger operation of the user on the keyboard 250, the first terminal can enter an operation instruction (for example, a carriage return instruction and a space instruction) on the display 220, and can also enter text data on the display.

In response to a sliding operation of the user on the touchpad 260, the first terminal can move the cursor displayed on the display 220.

The speaker 270, also referred to as a "horn", is configured to convert an audio electrical signal into a sound signal. The first terminal can listen to music through the speaker 270, or emit ultrasonic waves. In embodiments of this application, a speaker 270 may be disposed on each side of the first terminal, so that the first terminal determines a direction of a discovered device relative to the first terminal.

The memory 290 may be configured to store computer-executable program code. The executable program code includes instructions. For example, the memory may be implemented as a random access memory, a read-only memory, a flash memory, a removable memory, other types of storage elements, or a combination of such devices. The memory 290 may include a program storage area and a data storage area. The memory 290 may store data in the data storage area, and the program storage area may store program instructions corresponding to the method according to embodiments of this application. For example, the memory 290 stores information such as identity information of a device to which a short-range communication connection is established, and a connection moment.

The following describes, by using an example in which the first terminal is a laptop computer 200, and the second terminal is a mobile phone 100, the technical solutions of this application and how to resolve the foregoing technical problems according to the technical solutions of this application in detail with reference to specific embodiments. The following several specific embodiments may be independently implemented, and may also be combined with each other, and the same or similar concepts or processes may not be described repeatedly in some embodiments. It should be noted that The first terminal and the second terminal may be terminal devices such as laptop computers, tablet computers, and mobile phones. The first terminal and the second terminal may be devices of a same type, for example, the first terminal and the second terminal are both laptop computers; or the first terminal and the second terminal may be devices of different types, for example, the first terminal is a laptop computer, and the second terminal is a mobile phone or a tablet computer.

Figure 3:
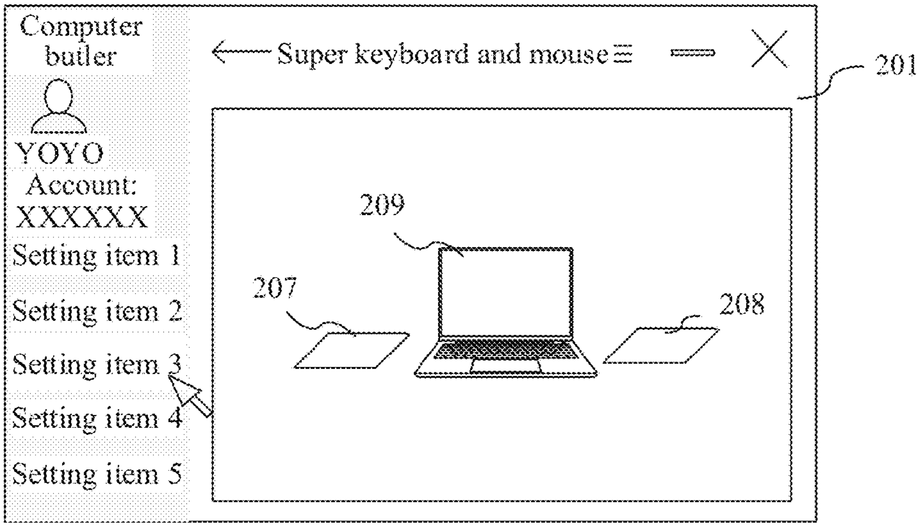
FIG. 3 is a schematic interface diagram in which a laptop computer 200 displays a second interface in response to a click operation on a setting item 3 according to an embodiment of this application.

An embodiment of this application provides a device connection establishment method, applied to a laptop computer (namely, a first terminal). As shown in FIG. 3, a laptop computer may display a first window (not shown in the figure) in response to an operation on an icon or an option of "Computer manager" displayed on the laptop computer. The first window is a first interface of "Computer manager" (namely, a first application). The first interface includes an option list, and the option list includes a setting item 1, a setting item 2, a setting item 3, a setting item 4, and a setting item 5. A specific name of "Setting item 3" (namely, a first control) may be: a name, for example, "Hardware sharing", "Super control", or "Device connection". This is not limited herein. As shown in FIG. 3, the first interface 201 may further include an icon 209 of the laptop computer (namely, a first identifier of the first terminal), a first subarea 207 located to the left side (namely, a first side) of the icon 209 of the laptop computer, and a second subarea 208 located to the right side (namely, a second side) of the icon 209 of the laptop computer.

Figure 4:
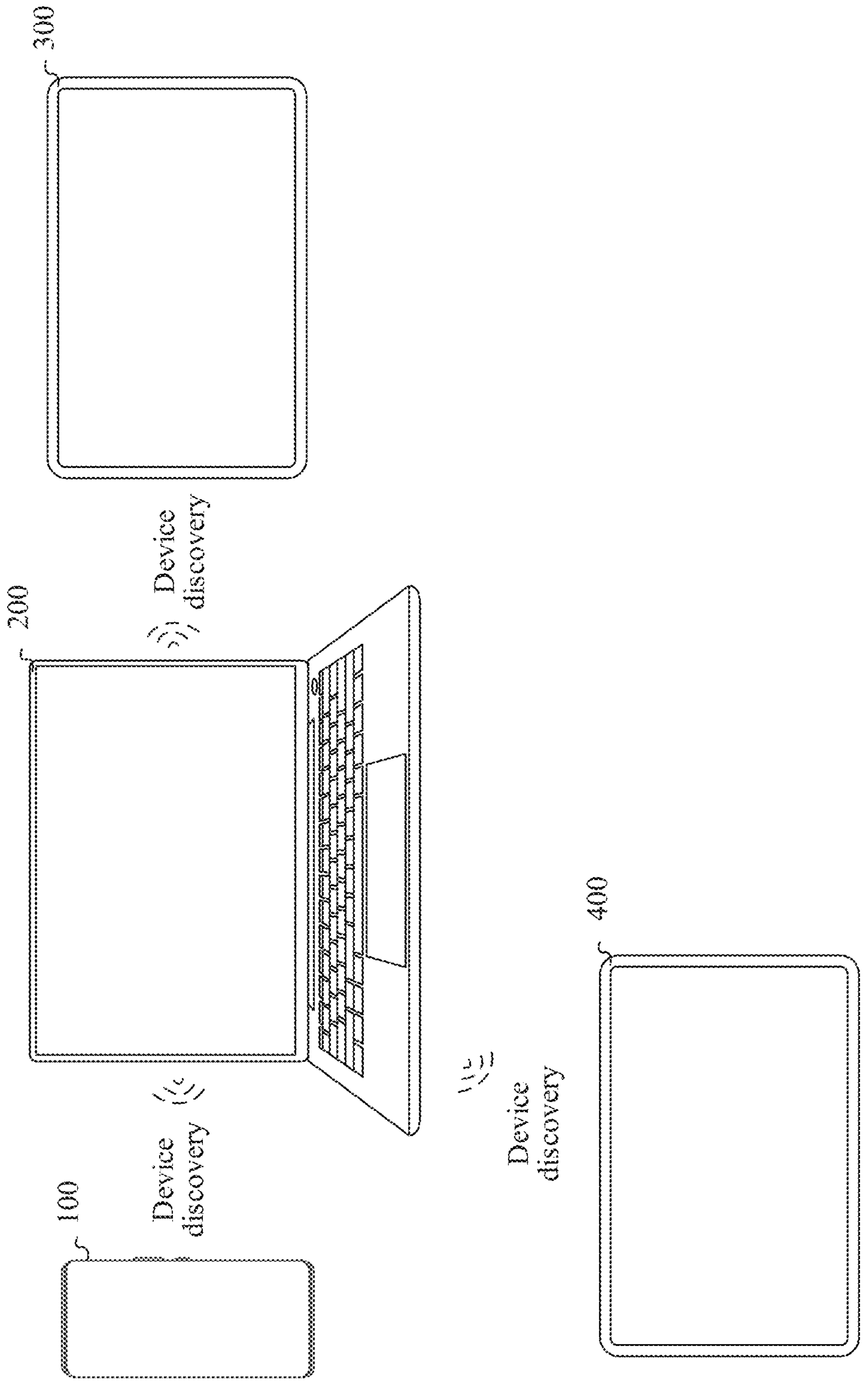
FIG. 4 is a schematic diagram of a principle of performing device discovery by a laptop computer 200 according to an embodiment of this application.

In addition, as shown in FIG. 3, the laptop computer displays a second interface 201 in the first window in response to a click operation on the option "Setting item 3". The laptop computer 200 performs device discovery when displaying the second interface 201. As shown in FIG. 4, the laptop computer 200 discovers a mobile phone 100, a tablet computer 300, and a tablet computer 400. A distance between the laptop computer 200 and each of the mobile phone 100, the tablet computer 300, and the tablet computer 400 is within a distance threshold.

Figure 5:
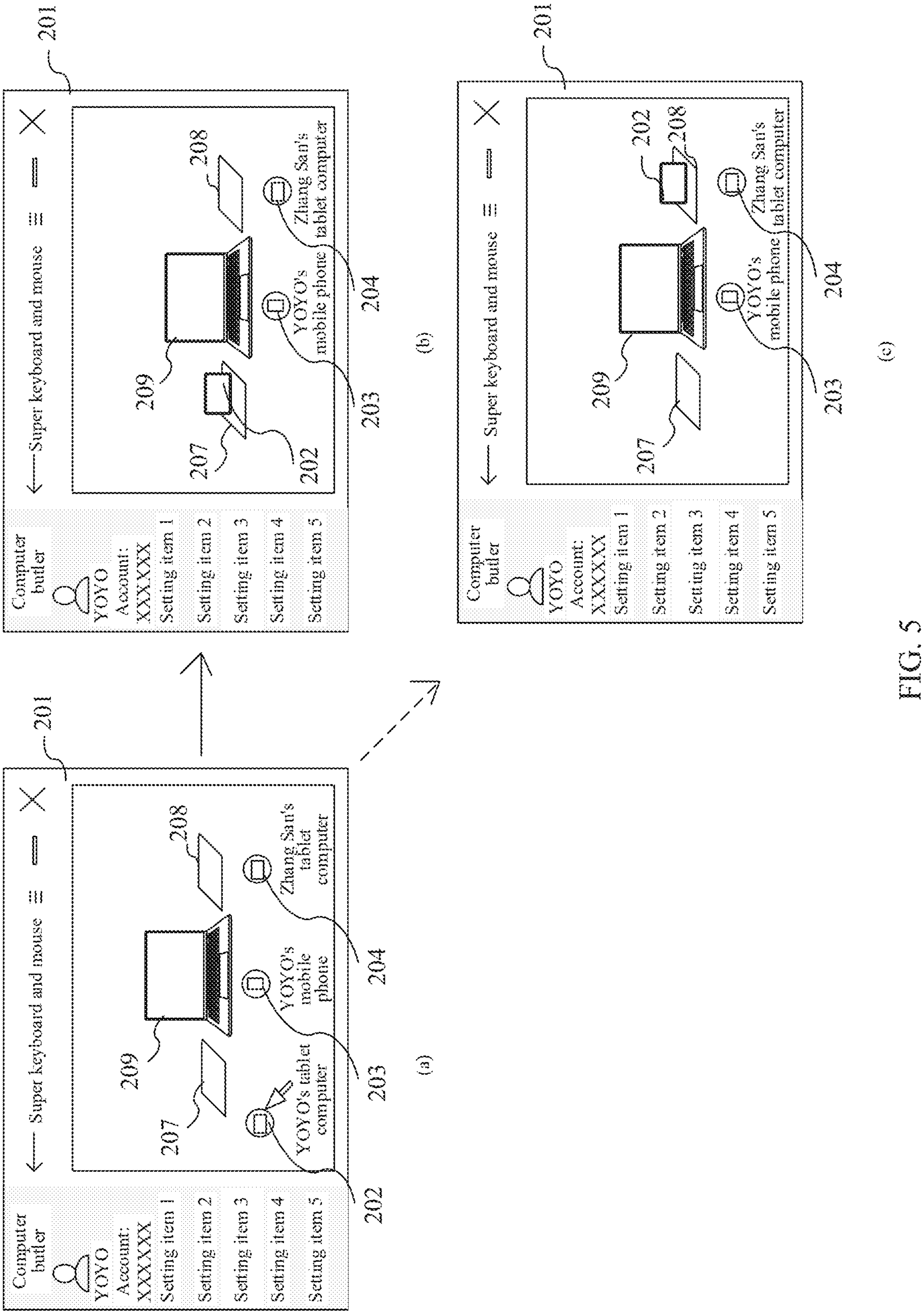
FIG. 5 is a schematic interface diagram in which a laptop computer 200 establishes a short-range communication connection with a tablet computer 300 in response to a click operation on an icon of the tablet computer 300 according to an embodiment of this application.

As shown in (a) in FIG. 5, the laptop computer 200 may display an icon 203 of the discovered mobile phone 100, an icon 202 of the discovered tablet computer 300, and an icon 204 of the discovered tablet computer 400 (namely, second identifiers of discovered devices) on the second interface 201. The icon 203 of the mobile phone 100, the icon 202 of the tablet computer 300, and the icon 204 of the tablet computer 400 may be located on the lower side of the icon 209 of the laptop computer 200 (namely, a second area). Certainly, the icon 203 of the mobile phone 100, the icon 202 of the tablet computer 300, and the icon 204 of the tablet computer 400 may be located on the upper side, the left side, or the right side of the icon 209 of the laptop computer 200. This is not limited herein. The icon 203 of the mobile phone 100, the icon 202 of the tablet computer 300, and the icon 204 of the tablet computer 400 may be referred to as first icons.

Still as shown in (a) in FIG. 5, the icon 203 of the mobile phone 100 is associated with identity information "YOYO's mobile phone" of the mobile phone 100, the icon 202 of the tablet computer 300 is associated with identity information "YOYO's tablet computer" of the tablet computer 300, and the icon 204 of the tablet computer 400 is associated with identity information "Zhang San's tablet computer" of the tablet computer 400. "YOYO" is a user name for logging in to operating systems of the mobile phone 100 and the tablet computer 300, and "Zhang San" is a user name for logging in to an operating system of the tablet computer 400. In this way, the user can accurately perceive a device corresponding to each first icon based on each piece of identity information.

In this case, no device icon is displayed in the first subarea 207 and the second subarea 208, indicating that the laptop computer 200 does not establish a short-range communication connection with any device. In this case, the laptop computer 200 can guide the user to implement a connection between devices through visual effects, for example, the laptop computer can control the first subarea 207 and the second subarea 208 to flash, or to switch colors every preset duration (such as 0.5 s), to guide the user to click or drag one or more first icons of one or more devices, so as to establish a short-range communication connection with the device.

Still as shown in (a) in FIG. 5, the laptop computer 200 can establish a short-range communication connection with the tablet computer 300 in response to a click operation (namely, the first operation) on the icon 202 of the tablet computer 300 (namely, an identifier of a second terminal).

In some embodiments, a process in which the laptop computer 200 establishes the short-range communication connection with the tablet computer 300 may be: The laptop computer 200 sends a first request to the tablet computer 300 in response to the click operation on the icon 202 of the tablet computer 300, where the first request is used to request to establish the short-range communication connection, and the first request carries identity information (for example, a physical address) of the laptop computer 200. In response to the first request, the tablet computer 300 determines whether the identity information of the laptop computer 200 is recorded. When the identity information of the laptop computer 200 is recorded, indicating that the tablet computer 300 has connected to the laptop computer 200, the tablet computer 300 feeds back an acknowledgment message to the laptop computer 200. In this way, data security of the laptop computer 200 can be improved. When the tablet computer 300 does not record the identity information of the laptop computer 200, the tablet computer 300 may display first prompt information (not shown in the figure), where the first prompt information is used to indicate to establish the short-range communication connection with the laptop computer 200. When responding to a confirm operation on the first prompt information, the tablet computer 300 feeds back the acknowledgment message to the laptop computer 200. In this way, data security of the laptop computer 200 can be improved. When receiving the acknowledgment message fed back by the tablet computer 300, the laptop computer 200 establishes the short-range communication connection with the tablet computer 300.

In some other embodiments, a process in which the laptop computer 200 establishes the short-range communication connection with the tablet computer 300 may be: The laptop computer 200 sends a first request to the tablet computer 300, where the first request is used to request to establish the short-range communication connection, and the first request carries a user account for logging in to the laptop computer 200.

In response to the first request, the tablet computer 300 determines whether a user account for logging in to the tablet computer 300 is consistent with the user account for logging in to the laptop computer 200. When the user account for logging in to the tablet computer 300 is consistent with the user account for logging in to the laptop computer 200, it indicates that the tablet computer 300 and the laptop computer 200 belong to a same user. Further, the tablet computer 300 feeds back an acknowledgment message to the laptop computer 200. In this way, data security of the laptop computer 200 can be improved. When the user account for logging in to the tablet computer 300 is inconsistent with the user account for logging in to the laptop computer 200, the tablet computer 300 may display first prompt information, where the first prompt information is used to indicate to establish the short-range communication connection with the laptop computer 200. When responding to a confirm operation on the first prompt information, the tablet computer 300 feeds back the acknowledgment message to the laptop computer 200. In this way, data security of the laptop computer 200 can be improved. When receiving the acknowledgment message fed back by the tablet computer 300, the laptop computer 200 establishes the short-range communication connection with the tablet computer 300.

The short-range communication connection may be a Wi-Fi connection, a Bluetooth connection, or an ultra wide band (UWB) connection, and the like. This is not limited herein.

As shown in (b) in FIG. 5, after the laptop computer 200 successfully establish the short-range communication connection with the tablet computer 300, the laptop computer 200 may display the icon 202 of the tablet computer 300 in the first subarea 207 located on the left side of the icon 209 of the laptop computer 200. When the icon of the tablet computer 300 is in the first subarea 207, the laptop computer 200 can more intuitively show the user that the laptop computer 200 and the tablet computer 300 are connected. In addition, when the icon of the tablet computer 300 is in the first subarea 207, the laptop computer 200 no longer displays the icon of the tablet computer 300 located on the lower side of the icon 209 of the laptop computer 200.

It should be noted that, in (b) in FIG. 5, a display state of the icon 202 of the tablet computer 300 located in the first subarea 207 is different form a display state of the icon 202 of the tablet computer 300 located on the lower side of the icon 209 of the laptop computer 200. For example, a size of the icon 202 of the tablet computer 300 located in the first subarea 207 is different form a size of the icon 202 of the tablet computer 300 located on the lower side of the icon 209 of the laptop computer 200. Moreover, when the icon of the tablet computer 300 is located on the lower side of the icon 209 of the laptop computer 200, one side of the icon 202 of the tablet computer 300 is associated with the identity information of the tablet computer 300. When the icon 202 of the tablet computer 300 is located in the first subarea 207, one side of the icon 202 of the tablet computer 300 is not associated with the identity information of the tablet computer 300.

In some other embodiments, a display state of the icon 202 of the tablet computer 300 located in the first subarea 207 may alternatively be the same as a display state of the icon 202 of the tablet computer 300 located on the lower side of the icon 209 of the laptop computer 200. This is not limited herein.

Alternatively, on the basis of (a) in FIG. 5, a corresponding solution in (c) in FIG. 5 can also be implemented. As shown in (c) in FIG. 5, after the laptop computer 200 successfully establish the communication connection with the tablet computer 300, the laptop computer 200 may alternatively display the icon of the tablet computer 300 in the second subarea 208 located on the right side of the icon 209 of the laptop computer 200. When the icon of the tablet computer 300 is in the second subarea 208, the laptop computer 200 can also more intuitively show the user that the laptop computer 200 and the tablet computer 300 are connected.

For example, when display content in the first subarea 207 and display content in the second subarea 208 are both empty, a display area of the icon 202 of the tablet computer 300 may be determined based on the following manners.

Manner 1: If the laptop computer 200 has established the short-range communication connection with the tablet computer 300 based on the first interface 101, the icon of the tablet computer 300 is displayed in an area in which the icon of the tablet computer 300 is displayed last time.

Manner 2: If the laptop computer 300 does not establish the short-range communication connection with the tablet computer 300 based on the first interface 101, the icon of the tablet computer 300 is displayed in the first subarea 207 on the left side of the icon 209 of the laptop computer 200.

After the laptop computer 200 establishes the short-range communication connection with the tablet computer 300, the laptop computer 200 and the tablet computer 300 enter a preset mode. The preset mode may also be referred to as an input device sharing mode. This is not limited herein. In the preset mode, the laptop computer 200 has a function of sharing an input device with the tablet computer 300.

Figure 6:
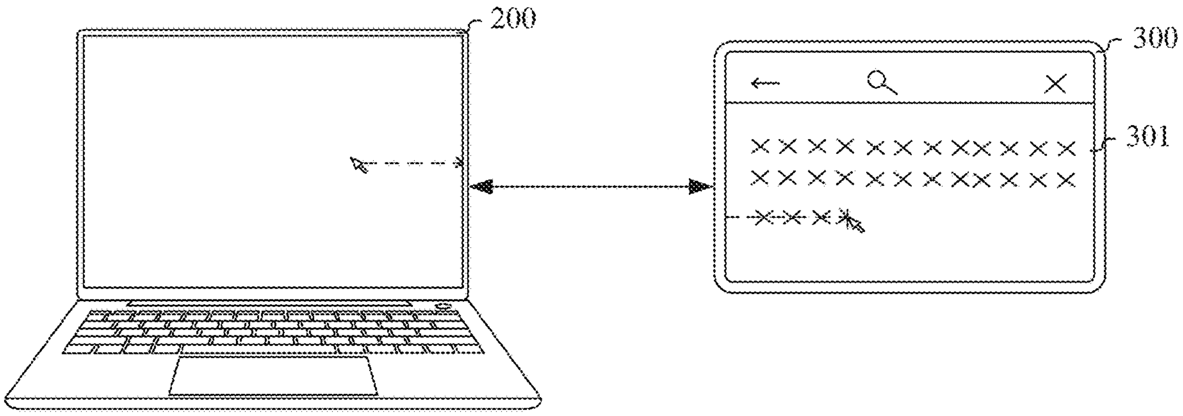
FIG. 6 is a schematic interface diagram in which a laptop computer 200 moves a cursor to an interface of a tablet computer 300 in response to a moving operation of a user on the cursor according to an embodiment of this application.

For example, as shown in FIG. 6, in response to an operation of moving a cursor to the right edge of a display of the laptop computer 200 (namely, an interface displayed on the laptop computer 200) by the user (for example, the laptop computer 200 responds to an operation of dragging a mouse to the right edge of the display by the user, namely, a second operation), the laptop computer 200 controls the cursor (namely, a focal position at which an instruction can be entered) to move to the edge of the display of the laptop computer 200. In this case, the laptop computer 200 can also continue to respond to an operation of moving the cursor in a direction of the tablet computer 300 by the user (namely, the second operation), and control the cursor to move to an interface 301 displayed on the tablet computer 300.

In this way, when the input device, for example, the mouse, the touchpad, and the keyboard of the laptop computer 200 receives an input operation, the laptop computer 200 may send a control instruction to the tablet computer 300 in response to the operation of the user. In response to the control instruction from the laptop computer 200, the tablet computer 300 performs a function corresponding to the control instruction.

For example, as shown in FIG. 6, the interface 301 is a text input interface. When the user enters a text editing operation (namely, a third operation) on the keyboard of the laptop computer 200, the tablet computer 300 displays data corresponding to the text editing operation on a text input interface (namely, a function corresponding to the third operation). When the user enters an operation of moving the mouse (namely, the third operation) by using the touchpad or the mouse of the laptop computer 200, the laptop computer 200 sends a control instruction to the tablet computer in response to the operation of the user. In response to the operation of moving the mouse, the tablet computer 300 controls, based on the control instruction, the cursor on the text input interface to move with the operation of moving the mouse (namely, the function corresponding to the third operation). Alternatively, when the user performs an operation of a left or right button of the mouse (namely, the third operation) by using the touchpad or the mouse of the laptop computer 200, in response to the operation of the user, the tablet computer 300 performs a function corresponding to the operation of the left or right button of the mouse on the text input interface (namely, the function corresponding to the third operation).

It should be noted that when the tablet computer 300 performs the corresponding function on the text input interface in response to the operation of the user, there is no correlation between content of the interface displayed by the laptop computer 200 and content of the interface 301, that is, the laptop computer 200 does not respond to the operation of the user.

In conclusion, according to the device connection establishment method provided in embodiments of this application, the laptop computer 200 can intuitively show a connection between the laptop computer 200 and another device to the user by displaying the identity information of the discovered device around the icon of the laptop computer 200 and the first icon associated with the identity information of each device, and moving the discovered device from the second area to the first area after the connection is established. Then, the user clicks on the icon of the tablet computer 300 to establish the short-range communication connection with the tablet computer 300. The laptop computer 200 and the tablet computer 300 enter the preset mode. The laptop computer 200 can have the function of sharing the input device in the laptop computer 200 with the tablet computer 300. Operation steps are convenient and simple, and efficiency is high. In addition, a connection process can be implemented by operating the icon of the discovered device. Compared with the related technology in which two devices need to be set separately, operations are more convenient and fast, and experience is good.

It should be noted that the embodiment corresponding to FIG. 5 is described by using an example in which the laptop computer 200 establishes a short-range communication connection with a device and enters the preset mode. The following describes how the laptop computer 200 connects with more devices and enter the preset mode by using an example in which the icon of the connected tablet computer 300 is in the second subarea 208.

Figure 7:
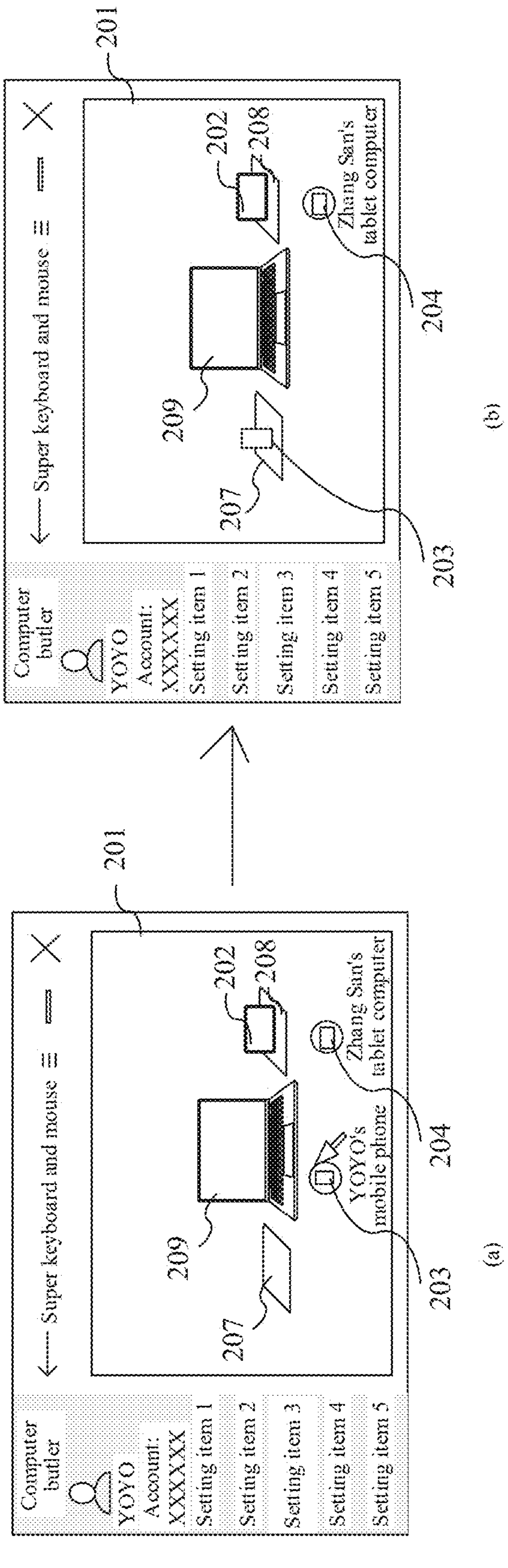
FIG. 7 is a schematic interface diagram in which a laptop computer 200 establishes a short-range communication connection with a mobile phone 100 based on a short-range communication connection with a tablet computer 300 according to an embodiment of this application.

As shown in (a) in FIG. 7, the laptop computer 200 establishes a short-range communication connection with the mobile phone 100 (namely, a third terminal) in response to a click operation (namely, the first operation) on the icon 203 of the mobile phone 100 (namely, an identifier of the third terminal). A principle of establishing the short-range communication connection with the mobile phone 100 by the laptop computer 200 is the same as a principle of establishing the short-range communication connection with the tablet computer 300 by the laptop computer 200. Details are not described herein. In this case, as shown in (b) in FIG. 7, when detecting that content displayed in the first subarea 207 is empty, the laptop computer 200 can display the icon 203 of the mobile phone 100 in the first subarea 207. In this way, the laptop computer 200 can more intuitively show the user that the laptop computer 200 and the mobile phone 100 are connected.

After the laptop computer 200 establishes the short-range communication connection with the mobile phone 100, the laptop computer 200 further has the function of sharing the input device with the mobile phone 100. A process of sharing the input device with the mobile phone 100 by the laptop computer 200 is the same as a process of sharing the input device with the tablet computer 300 by the laptop computer 200. A difference may be that the laptop computer determines a device to share the input device based on a direction of a movement of the mouse and a staying position of the mouse. For example, as shown in (b) in FIG. 7, when the user moves the mouse rightward to the edge of the display of the laptop computer, in response to the operation of the user, the cursor of the mouse is displayed on the interface of the tablet computer 300 corresponding to the icon 202, to share the input device with the tablet computer. When the user moves the cursor of the mouse leftward to the edge of the display of the laptop computer 200, in response to the operation of moving the cursor of the mouse leftward by the user, the cursor of the mouse is displayed on the interface of the mobile phone 100 corresponding to the icon 203, to share the input device with the mobile phone. The foregoing is only an example of sharing an input device when two devices are connected, and this application is not limited thereto. For example, different devices may share an input device by moving the mouse to different positions on the edge of the same side of the laptop computer.

Figure 8:
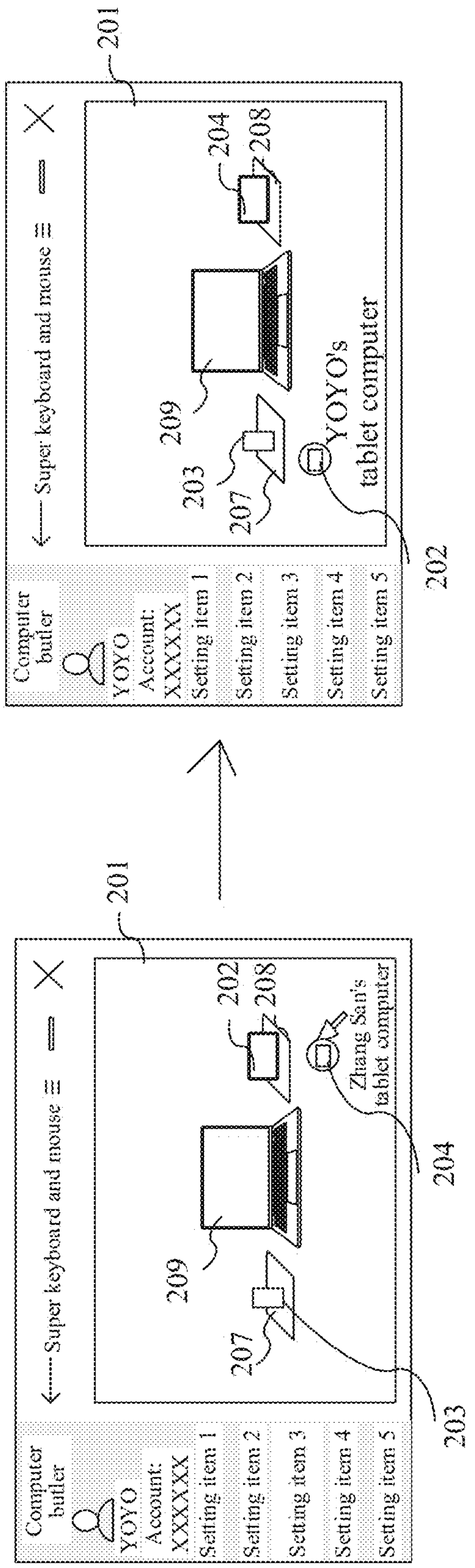
FIG. 8 is a schematic diagram in which a laptop computer 200 disconnects, in response to a click operation on an icon 204 of a tablet computer 400, a short-range communication connection with a tablet computer 300, and establishes a short-range communication connection with the tablet computer 400 based on short-range communication connections with the tablet computer 300 and a mobile phone 100 according to an embodiment of this application.

In some embodiments, when an upper limit of a quantity of connectable devices set by the laptop computer 200 is 2, on the basis of the corresponding embodiments in FIG. 7, as shown in (a) in FIG. 8, the laptop computer 200 detects a click operation (namely, the first operation) on the icon 204 of the tablet computer 400 (namely, an identifier of a fourth terminal). In this case, the laptop computer 200 detects that two devices are connected. In this way, the laptop computer 200 can determine, from the connected devices, that an earliest connected device is the tablet computer 300.

Further, the laptop computer 200 is disconnected from the tablet computer 300, and the laptop computer 200 establishes a short-range communication connection with the tablet computer 400 (namely, the fourth terminal). As shown in (b) in FIG. 8, the laptop computer 200 moves the icon of the tablet computer 300 in the second subarea 208 to the lower side of the icon 209 of the laptop computer 200 for display. In addition, the laptop computer 200 moves the icon 204 of the tablet computer 400 to the second subarea 208 for display. That is, the laptop computer 200 shows the user more intuitively that the laptop computer 200 is connected to the tablet computer 400 and is not connected to the tablet computer 300.

When the laptop computer 200 is disconnected from the tablet computer 300, after the laptop computer 200 establishes the short-range communication connection with the tablet computer 400, the laptop computer 200 can also have a function of sharing the input device with the tablet computer 400, and no longer has the function of sharing the input device with the tablet computer 300. A process of sharing the input device with the tablet computer 400 by the laptop computer 200 is the same as the process of sharing the input device with the tablet computer 300 by the laptop computer 200. Details are not described herein again. In this way, the laptop computer 200 can move the cursor to an interface of the tablet computer 400 in response to an operation of moving the cursor to the right edge of the interface of the laptop computer 200 by the user. In some other embodiments, when the upper limit of the quantity of connectable devices set by the laptop computer 200 is greater than 2, the laptop computer 200 may also maintain the short-range communication connection with the tablet computer 300 after establishing the short-range communication connection with the tablet computer 400. In this way, in addition to the first subarea 107 and the second subarea 108, more areas may also be near the icon 209 of the laptop computer 200 on the second interface 201 for displaying an icon of a newly connected device, and the user can more intuitively show that the laptop computer 200 is connected to the newly connected device. Alternatively, a plurality of devices can be displayed in one area, indicating that the laptop computer can be moved to this side to share the input device with any of the plurality of devices.

It should be noted that, in the embodiments corresponding to FIG. 5 to FIG. 8, how an icon of a device with which a short-range connection is established is displayed on the second interface 201 is described by using an example in which the laptop computer 200 does not recognize a direction of the device. With reference to FIG. 9 to FIG. 12, the following describes, by using an example in which the laptop computer 200 recognizes a direction of a device with which a short-range connection is established, how an icon of the device is displayed on the second interface 201.

On the basis of the embodiment corresponding to FIG. 3, the laptop computer 200 can recognize directions of the mobile phone 100, the tablet computer 300, and the tablet computer 400 relative to the laptop computer 200 when discovering the mobile phone 100, the tablet computer 300, and the tablet computer 400.

Figure 9:
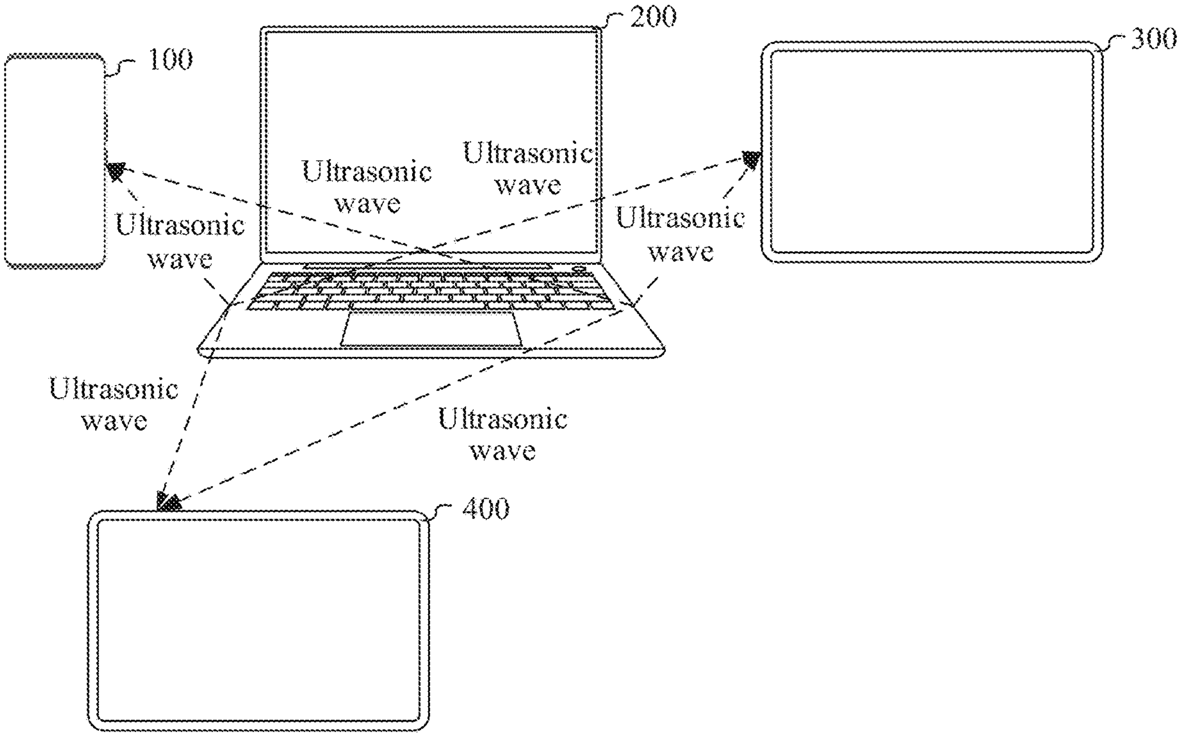
FIG. 9 is a schematic diagram of a principle of recognizing a direction of a device by a laptop computer 200 according to an embodiment of this application.

For example, speakers are disposed on both the left side and the right side of the laptop computer 200. When the laptop computer 200 discovers the mobile phone 100, the tablet computer 300, and the tablet computer 400, as shown in FIG. 9, the speaker on the left side of the laptop computer 200 emits an ultrasonic wave of a first frequency, and the speaker on the right side of the laptop computer 200 emits an ultrasonic wave of a second frequency. Both the ultrasonic wave of the first frequency and the ultrasonic wave of the second frequency carry a physical address of the laptop computer 200. Because the mobile phone 100 is located on the left side of the laptop computer 200, the mobile phone 100 receives the ultrasonic wave of the first frequency before receiving the ultrasonic wave of the second frequency. Further, the mobile phone 100 can feed back a first indication to the laptop computer 200 based on the physical address carried by the ultrasonic wave of the first frequency, where the first indication is used to indicate that the mobile phone receives the ultrasonic wave of the first frequency before receiving the ultrasonic wave of the second frequency. The laptop computer 200 determines that the mobile phone 100 is located on the left side of the laptop computer 200 based on the first indication. Similarly, the laptop computer 200 can determine, based on a same principle, that the tablet computer 400 is located on the left side of the laptop computer 200 and the tablet computer 300 is located on the right side of the laptop computer 200. In other words, the laptop computer 200 has a function of recognizing a position of a discovered device.

It can be learned from the embodiment corresponding to FIG. 9 that the mobile phone 100, the tablet computer 300, and the tablet computer 400 are arranged from left to right in an X-axis direction (namely, a horizontal direction), the mobile phone 100 and the tablet computer 400 are located on the left side of the laptop computer 200, and the tablet computer 300 is located on the right side of the laptop computer 200.

Figure 10:
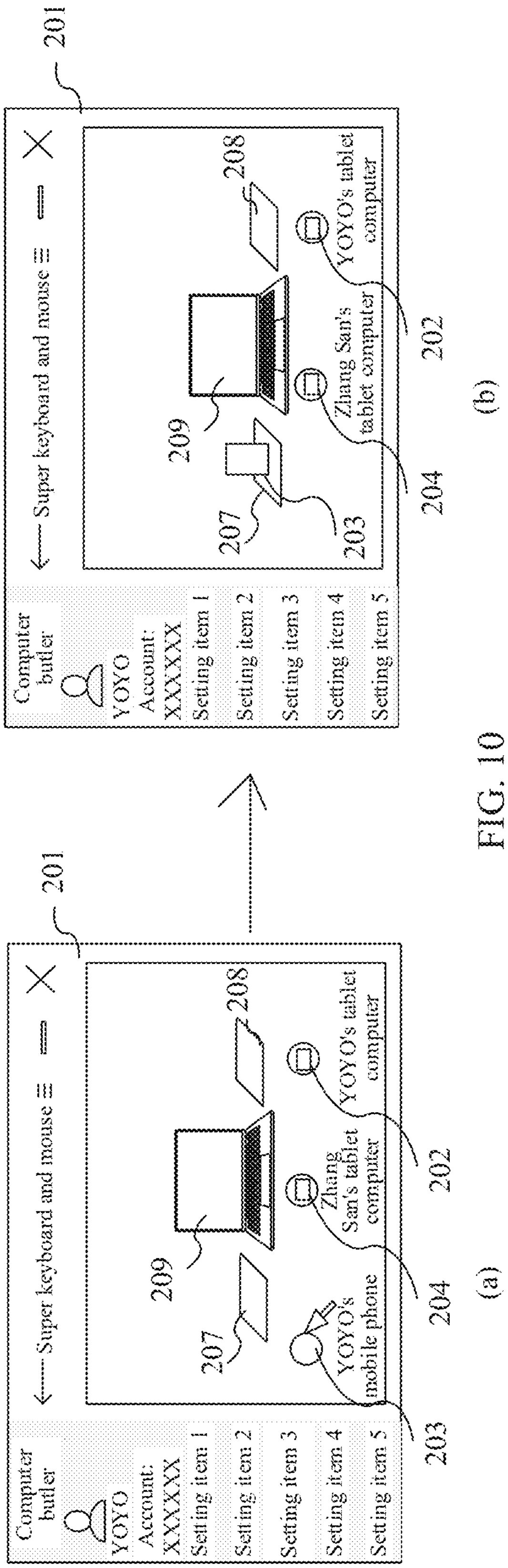
FIG. 10 is a schematic interface diagram in which a laptop computer 200 establishes a short-range communication connection with a mobile phone 100 in response to a click operation on an icon 203 of the mobile phone according to an embodiment of this application.
Figure 11:
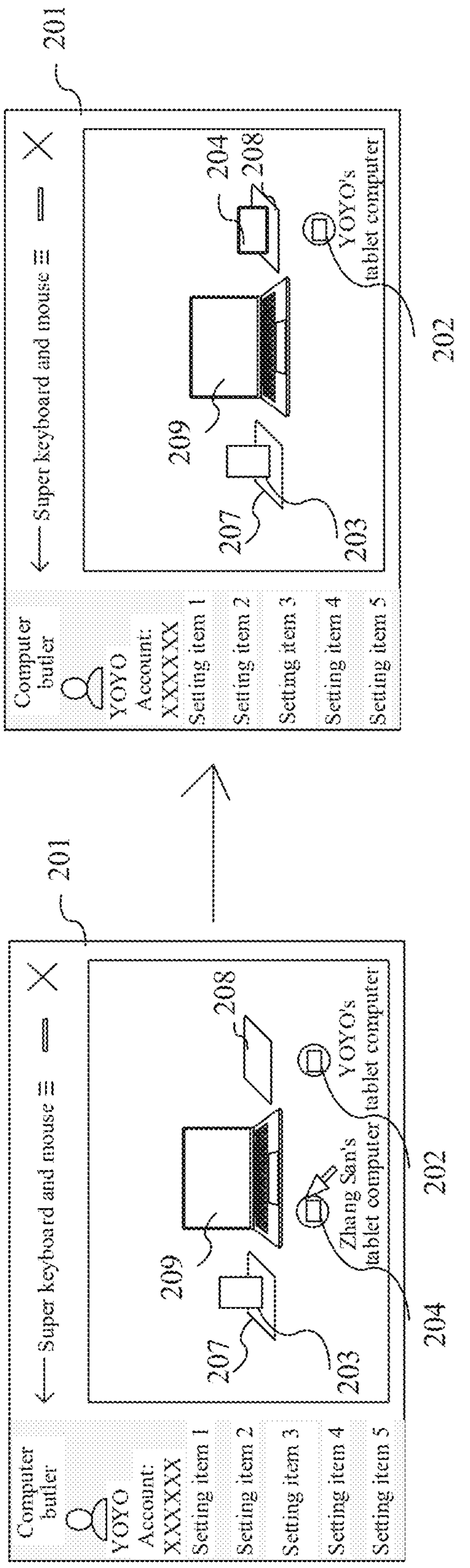
FIG. 11 is a schematic interface diagram in which a short-range communication connection is established with a tablet computer 400 based on a short-range communication connection with a mobile phone 100 according to an embodiment of this application.

Further, as shown in (a) in FIG. 10, the laptop computer 200 may sequentially display an icon 203 of the discovered mobile phone 100, an icon 204 of the discovered tablet computer 400, and an icon 202 of the discovered tablet computer 300 on the second interface 201 from left to right. The icon 203 of the mobile phone 100 is associated with identity information "YOYO's mobile phone" of the mobile phone 100, the icon 202 of the tablet computer 300 is associated with identity information "YOYO's tablet computer" of the tablet computer 300, and the icon 204 of the tablet computer 400 is associated with identity information "Zhang San's tablet computer" of the tablet computer 400. In this way, an arrangement manner of the icon 203 of the mobile phone 100, the icon 202 of the tablet computer 300, and the icon 204 of the tablet computer 400 can make the user more intuitively perceive positions of the mobile phone 100, the tablet computer 300, the laptop computer 200, and the tablet computer 400 in the X-axis direction. In this way, display content in the second interface 201 can be closer to the real world. This improves user experience.

In addition, when the laptop computer 200 recognizes that a position sequence of the mobile phone 100, the tablet computer 300, and the tablet computer 400 is changed, and a changed position sequence is: the tablet computer 400, the mobile phone 100, and the tablet computer 300 are arranged from left to right in the X-axis direction, the tablet computer 400 and the mobile phone 100 are located on the left side of the laptop computer 200, and the tablet computer 300 is located on the right side of the laptop computer 200, the laptop computer 200 may update a sequence of the icons of the devices in (a) in FIG. 10 to: the icon 204 of the tablet computer 400, the icon 203 of the mobile phone 100, and the icon 202 of the tablet computer 300 (not shown in the figure) sequentially arranged from left to right.

That is, when the laptop computer 200 recognizes that a position ranking of any device in the mobile phone 100, the tablet computer 300, and the tablet computer 400 in the X-axis direction is changed, the laptop computer 200 also updates the position sequence of the icon 203 of the mobile phone 100, the icon 204 of the tablet computer 400, and the icon 202 of the tablet computer 300 on the second interface 201, so that the position sequence of the icon 203 of the mobile phone 100, the icon 204 of the tablet computer 400, and the icon 202 of the tablet computer 300 is the same as a position sequence of the mobile phone 100, the tablet computer 300, and the tablet computer 400 in the real world.

As shown in (a) and (b) in FIG. 10, the laptop computer 200 establishes a short-range communication connection with the mobile phone 100 in response to a click operation on the icon 203 of the mobile phone 100. When the laptop computer 200 determines that the mobile phone 100 is located on the left side of the laptop computer 200, the icon 203 of the mobile phone 100 is displayed in the first subarea 207 located on the left side of the laptop computer 200. That is, the direction of the icon 203 of the mobile phone 100 relative to the icon 209 of the laptop computer 200 is the same as a direction of the mobile phone 100 relative to the laptop computer 200 in reality. In this way, the display content in the second interface 201 can be closer to the real world. This improves user experience. In addition, it also facilitates a user to move a cursor corresponding to an input device to an interface of the mobile phone 100.

After the laptop computer 200 establishes the short-range communication connection with the mobile phone 100, the laptop computer 200 and the mobile phone 100 enter a preset mode. In the preset mode, the laptop computer 200 has a function of sharing the input device with the mobile phone 100. Because the direction of the icon 203 of the mobile phone 100 relative to the icon 209 of the laptop computer 200 is the same as the direction of the mobile phone 100 relative to the laptop computer 200 in reality, when the user needs to share the input device with the mobile phone 100, the user can move, based on the direction of the icon 203 of the mobile phone 100 relative to the icon 209 of the laptop computer 200, the cursor to a side that is of a display of the laptop computer 200 and that is adjacent to the mobile phone 100. In response to a moving operation of the user, the laptop computer 200 moves the cursor to the edge of the side that is of the display of the laptop computer 200 and that is adjacent to the mobile phone 100. Further, the user continues to move, based on the direction of the icon 203 of the mobile phone 100 relative to the icon 209 of the laptop computer 200, the cursor to the side that is of the display of the laptop computer 200 and that is adjacent to the mobile phone 100. In this case, in response to the moving operation of the user, the laptop computer 200 can control the cursor to move to the interface displayed on the mobile phone 100. This is convenient and fast, and is more suitable for operating habits of the user.

It can be learned from the embodiment corresponding to FIG. 9 that the mobile phone 100, the tablet computer 300, and the tablet computer 400 are arranged from left to right in the X-axis direction, the mobile phone 100 and the tablet computer 400 are located on the left side of the laptop computer 200, and the tablet computer 300 is located on the right side of the laptop computer 200. Further, as shown in (a) and (b) in FIG. 11, on the basis that the laptop computer 200 is already connected to the mobile phone 100, the laptop computer 200 establishes a short-range communication connection with the tablet computer 400 in response to a click operation on the icon 204 of the tablet computer 400. The laptop computer 200 determines that the tablet computer 400 is located on the left side of the laptop computer 200. Further, when the laptop computer 200 detects that the icon 203 of the mobile phone 100 is already in the first subarea 207 located on the left side of the icon 209 of the laptop computer 200, the icon 204 of the tablet computer 400 is displayed in the second subarea 208 that is on the second interface 201 and that is located on the right side of the icon 209 of the laptop computer. In this way, the icon 204 of the tablet computer 400 does not occupy the icon 203 that is of the mobile phone 100 and that is located in a same direction as the laptop computer 200.

It can be learned from the embodiment corresponding to FIG. 9 that the mobile phone 100, the tablet computer 300, and the tablet computer 400 are arranged from left to right in the X-axis direction, the mobile phone 100 and the tablet computer 400 are located on the left side of the laptop computer 200, and the tablet computer 300 is located on the right side of the laptop computer 200. Similarly, after the laptop computer 200 establishes the short-range communication connection with the tablet computer 400, the laptop computer 200 further has a function of sharing the input device with the tablet computer 400. That is, in addition to the function of sharing the input device with the mobile phone 100, the laptop computer 200 may further have the function of sharing the input device with the tablet computer 400.

In a possible implementation, on the basis that the laptop computer 200 is already connected to the mobile phone 100 (namely, the second terminal), in response to a click operation on the icon 204 of the tablet computer 400 (namely, an identifier of a third terminal), the laptop computer 200 establishes the short-range communication connection with the tablet computer 400 (namely, the third terminal). The laptop computer 200 determines that the tablet computer 400 is located to the left side of the laptop computer 200, and can simultaneously display the icon 203 and the icon 204 in the first subarea 207 on the left side. In response to an operation of moving the cursor of the mouse to the left edge by the user, the laptop computer 200 can control the cursor to move to the interface displayed on the mobile phone 100 or an interface of the tablet computer 400. This is convenient and fast, and is more suitable for operating habits of the user. Specifically, the left side of the laptop computer 200 may be divided into an upper area and a lower area, and different areas can implement a function of sharing the input device with different devices. For example, the laptop computer 200 can share the input device with the mobile phone 100 in response to an operation of moving the cursor of the mouse to the upper left edge by the user, and the laptop computer 200 can share the input device with the tablet computer 400 in response to an operation of moving the cursor of the mouse to the lower left edge by the user.

Figure 12:
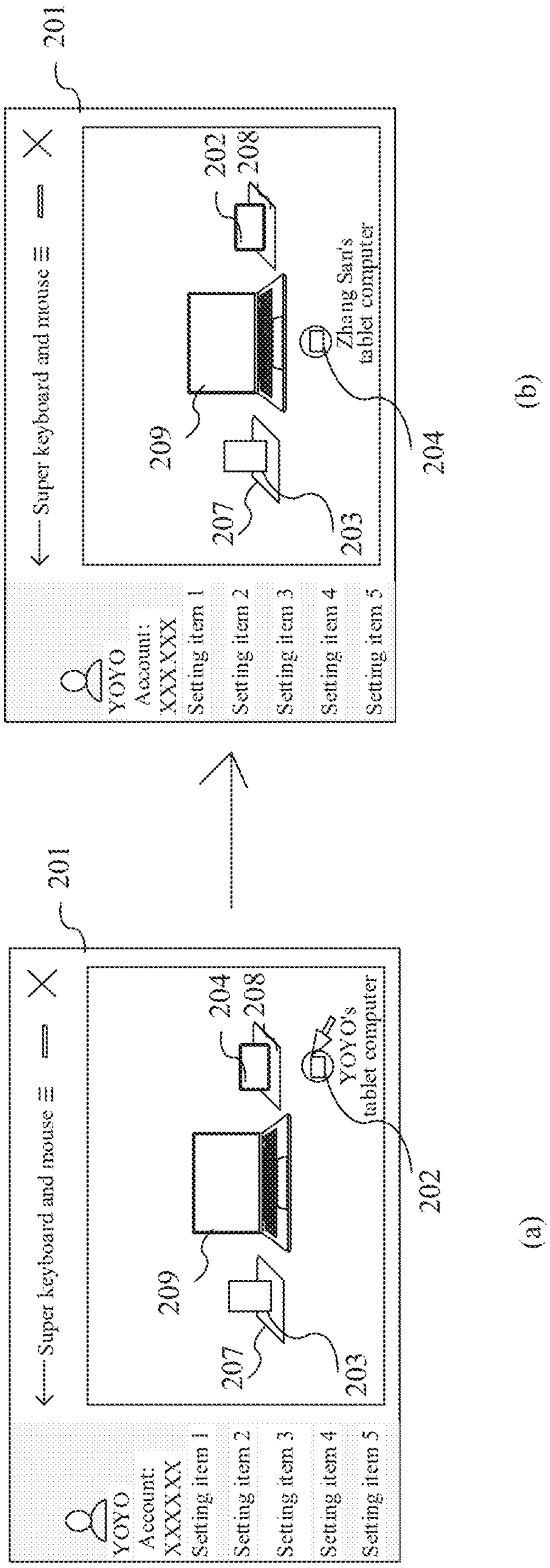
FIG. 12 is a schematic interface diagram in which a laptop computer 200 disconnects, in response to a click operation on an icon 202 of a tablet computer 300, a short-range communication connection with a tablet computer 400, and establishes a short-range communication connection with the tablet computer 300 based on short-range communication connections with the tablet computer 400 and a mobile phone 100 according to an embodiment of this application.

As shown in (a) and (b) in FIG. 12, on the basis that the laptop computer 200 is already connected to the mobile phone 100 (namely, the first terminal) and the tablet computer 400 (namely, the third terminal), in response to a click operation on the icon 202 of the tablet computer 300 (namely, an identifier of a fourth terminal), the laptop computer 200 determines that the tablet computer 300 (namely, the fourth terminal) is located on the right side of the laptop computer 200. Alternatively, the laptop computer 200 responds to an operation of moving the icon 202 of the tablet computer 300 (namely, the identifier of the fourth terminal) to the right side of the laptop computer 200, and after the user moves the icon 203 of the mobile phone 100 to the right side of the icon 209 of the laptop computer 200, the user raises a hand to stop touching a touchpad, or releases a left button of the mouse (that is, stops the moving operation). The laptop computer 200 detects that the user stops the moving operation on the icon 203 of the mobile phone 100.

In this case, the laptop computer 200 disconnects the short-range communication connection with the tablet computer 400 on the right side of the laptop computer 200, and establishes a short-range communication connection with the tablet computer 300. Further, the laptop computer 200 moves the icon 204 of the tablet computer 400 in the second subarea 208 to the lower side of the icon 209 of the laptop computer 200 for display, to indicate the laptop computer 200 to disconnect the short-range communication connection with the tablet computer 400.

Further, the laptop computer 200 moves the icon 202 of the tablet computer 300 and the identity information of the tablet computer 300 that are located on the lower side of the icon 209 of the laptop computer 200 to the second subarea 208 located on the right side of the icon 209 of the laptop computer, to indicate the laptop computer 200 to establish the short-range communication connection with the tablet computer 300. Similarly, a direction of the icon 202 of the tablet computer 300 relative to the icon 209 of the laptop computer 200 is the same as a direction of the tablet computer 300 relative to the laptop computer 200 in reality. In this way, the display content in the second interface 201 can be closer to the real world. This improves user experience. Further, the laptop computer 200 can move the cursor to the interface of the tablet computer 300 in response to an operation of moving the cursor to the right edge of the interface of the tablet computer 300 by the user.

Similarly, on the basis that the laptop computer 200 is already connected to the mobile phone 100 (namely, the first terminal) and the tablet computer 400 (namely, the third terminal), a principle that the laptop computer 200 determines that the tablet computer 300 (the fourth terminal) is located to the left side of the laptop computer 200, or the laptop computer 200 responds to an operation of moving the icon 202 of the tablet computer 300 (the identifier of the fourth terminal) to the left side of the laptop computer 200 is same as a principle of the embodiment corresponding to FIG. 12. Details are not described herein again.

Similar to the embodiment corresponding to FIG. 10, when the laptop computer 200 establishes the short-range communication connection with the tablet computer 300, the laptop computer 200 and the tablet computer 300 enter a preset mode. In the preset mode, the laptop computer 200 has a function of sharing the input device with the tablet computer 300. Because the direction of the icon 202 of the tablet computer 300 relative to the icon 209 of the laptop computer 200 is the same as the direction of the tablet computer 300 relative to the laptop computer 200 in reality, when the user needs to share the input device with the tablet computer 300, based on the direction of the tablet computer 300 relative to the laptop computer 200, the user can control, by using an operation of moving the cursor on the second interface 201 of the laptop computer 200 in a direction of the tablet computer 300, the cursor to move to the interface displayed on the tablet computer 300. This is convenient and fast, and is more suitable for operating habits of the user.

It should be noted that, in the foregoing embodiments, the laptop computer 200 establishes a short-range communication connection with a device in response to a click operation on an icon of the device. In some other embodiments, the laptop computer 200 may alternatively establish a short-range communication connection with a device in response to a moving operation on an icon of the device.

Figure 13:
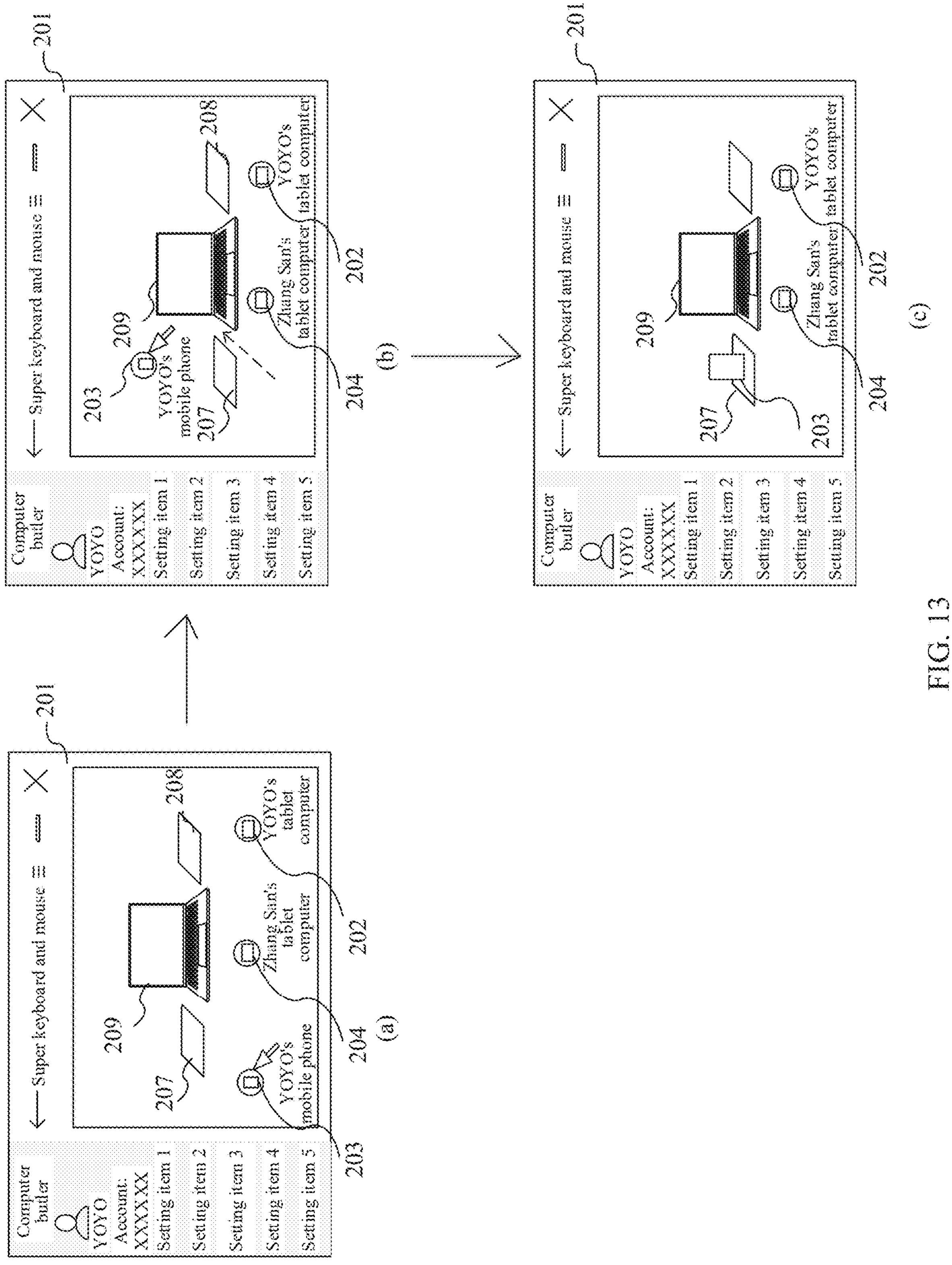
FIG. 13 is a schematic interface diagram in which a laptop computer 200 moves an icon 203 of a mobile phone to a first subarea 207 in response to a moving operation on the icon 203 of the mobile phone according to an embodiment of this application.

As shown in (a) in FIG. 13, when the mobile phone 100 is located to the left side of the laptop computer 200, the laptop computer 200 can move the icon 203 of the mobile phone 100 to the left side of the icon 209 of the laptop computer 200 in response to an operation of moving the icon 203 of the mobile phone 100 to the left side of the icon 209 of the laptop computer 200 (namely, a first operation) by the user. After the user moves the icon 203 of the mobile phone 100 to the left side of the icon 209 of the laptop computer 200, the user raises a hand to stop touching a touchpad, or releases a left button of the mouse (that is, stops the moving operation). In this case, as shown in (b) and (c) in FIG. 13, the laptop computer 200 detects that the user stops the moving operation on the icon 203 of the mobile phone 100, and the laptop computer 200 displays the icon 203 of the mobile phone 100 in the first subarea 207 on the left side of the icon 209 of the laptop computer 200. That is, the direction of the icon 203 of the mobile phone 100 relative to the icon of the laptop computer 200 is the same as a direction that is of an area in which the icon 103 of the mobile phone 100 is located and that is relative to the laptop computer 200. Further, the laptop computer 200 establishes the short-range communication connection with the mobile phone 100. Further, the laptop computer 200 can move the cursor to the interface of the mobile phone 100 in response to an operation of moving the cursor to the left edge of the interface of the mobile phone 100 by the user.

Figure 14:
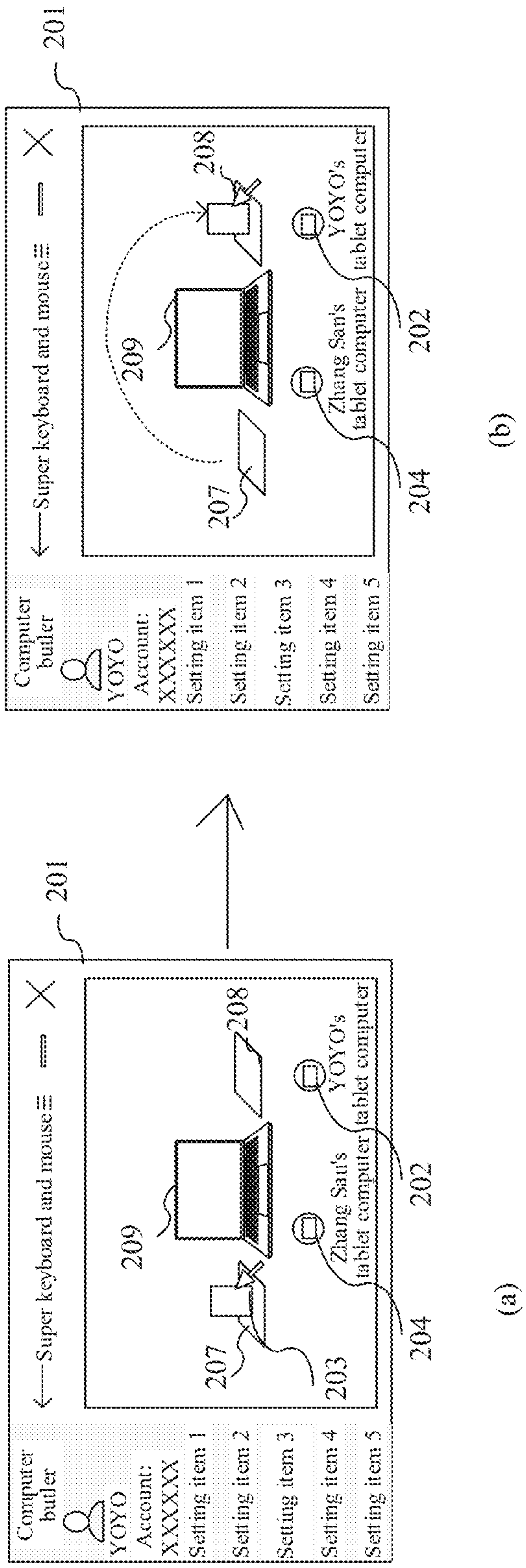
FIG. 14 is a schematic interface diagram in which a laptop computer 200 moves an icon 203 of a mobile phone from a first subarea 207 to a second subarea 208 in response to an operation of a user according to an embodiment of this application.

In addition, in some embodiments, when the mobile phone 100 is placed on the right side of the laptop computer 200, as shown in (a) and (b) in FIG. 14, the laptop computer 200 can move the icon 203 of the mobile phone 100 to the right side of the icon 209 of the laptop computer 200 in response to an operation of moving the icon 203 of the mobile phone 100 to the right side of the icon 209 of the laptop computer 200 by the user. After the user moves the icon 203 of the mobile phone 100 to the right side of the icon 209 of the laptop computer 200, the user raises the hand to stop touching the touchpad, or releases the left button of the mouse (that is, stops the moving operation). In this case, the laptop computer 200 detects that the user stops the moving operation on the icon 203 of the mobile phone 100, and the laptop computer 200 displays the icon 203 of the mobile phone 100 in the second subarea 208 on the right side of the icon 209 of the laptop computer 200. Further, the laptop computer 200 can move the cursor to the interface of the mobile phone 100 in response to an operation of moving the cursor to the right edge of the interface of the mobile phone 100 by the user. That is, the display content in the second interface can be closer to the real world. This improves user experience, and facilitates the user to move the cursor corresponding to the input device to the interface of the mobile phone 100.

In this way, the direction of the icon 103 of the mobile phone 100 relative to the icon of the laptop computer 200 is the same as the direction that is of the area in which the icon 103 of the mobile phone 100 is located and that is relative to the laptop computer 200. In this case, when the user moves the mouse to the right edge of the display of the laptop computer, the cursor can be moved to the display interface of the mobile phone 100, to implement input on the mobile phone 100 by using the input device. In this way, the user can switch a position of the icon 203 of the mobile phone 100 according to a requirement. It may be understood that, during an implementation process of the embodiment corresponding to FIG. 14, the laptop computer 200 maintains the short-range communication connection with the mobile phone 100.

Figure 15:
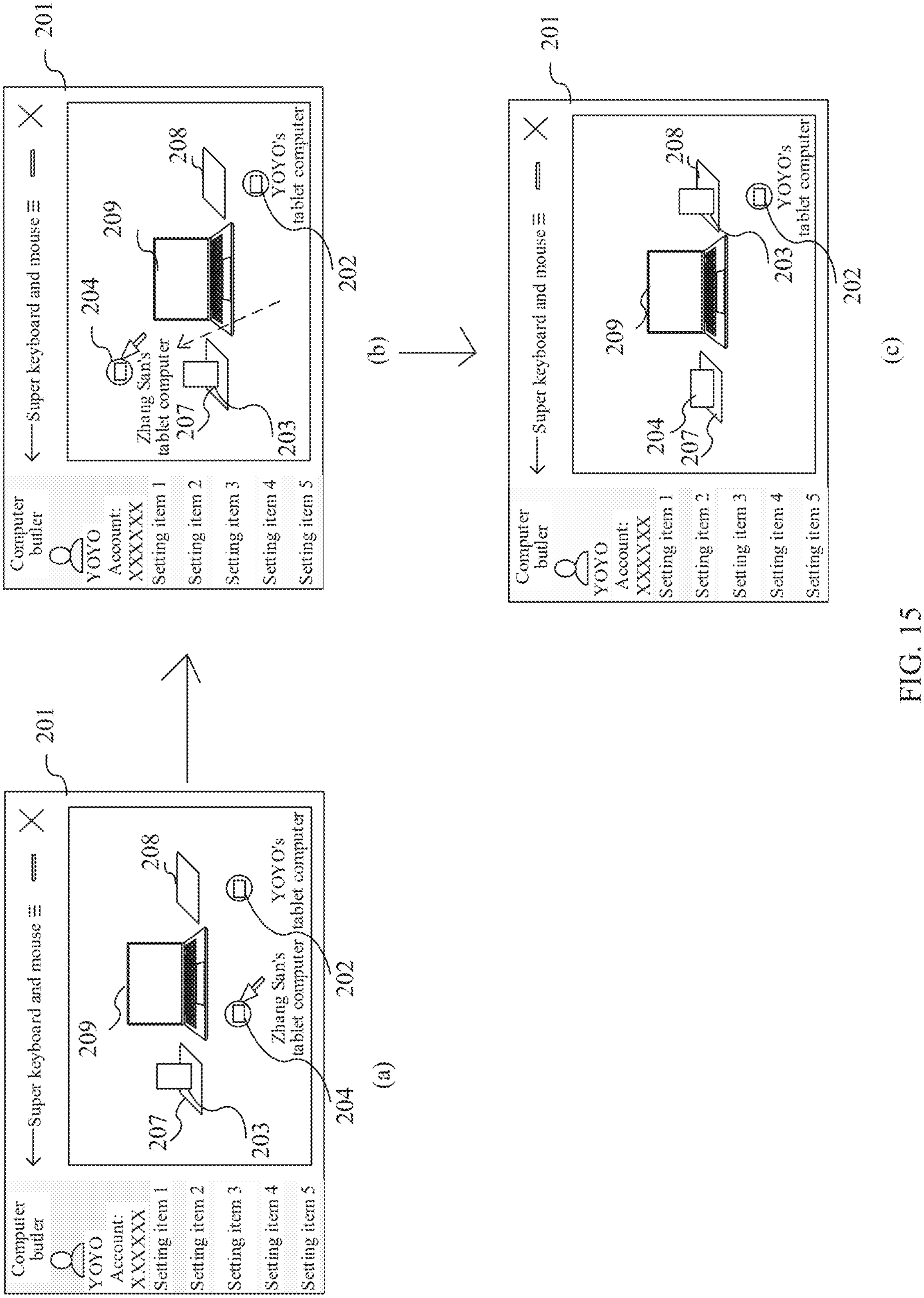
FIG. 15 is a schematic interface diagram in which a laptop computer 200 displays an icon 204 of a tablet computer 400 in a first subarea 207 and an icon 203 of a mobile phone in a second subarea 208 when displaying the icon 203 of the mobile phone in the first subarea 207 and moving the icon 204 of the tablet computer 400 to the left side of an icon 209 of the laptop computer 200 according to an embodiment of this application.

In addition, when the laptop computer 200 displays the icon 203 of the mobile phone 100 in the first subarea 207, as shown in (a) in FIG. 15, the laptop computer 200 moves the icon 204 of the tablet computer 400 to the left side of the icon 209 of the laptop computer 200 in response to an operation of moving the icon 204 of the tablet computer 400 to the left side of the icon 209 of the laptop computer 200 by the user. As shown in (b) and (c) in FIG. 15, after the user moves the icon 204 of the tablet computer 400 to the left side of the icon 209 of the laptop computer 200, the user raises the hand to stop touching the touchpad, or releases the left button of the mouse (that is, stops the moving operation). In this case, the laptop computer 200 detects that the moving operation on the icon 204 of the tablet computer 400 is stopped, and the laptop computer 200 establishes the short-range communication connection with the tablet computer 400. Further, the laptop computer 200 displays the icon 204 of the tablet computer 400 in the first subarea 207 on the left side of the icon 209 of the laptop computer 200, and the laptop computer 200 displays the icon 203 of the mobile phone 100 in the second subarea 208 on the right side of the icon 209 of the laptop computer 200. In this way, a device that is last connected and that is located on the left side of the laptop computer 200 can be displayed in the first subarea 207 on the left side of the icon 209 of the laptop computer 200. In this way, it is easier for the user to operate the laptop computer 200 by sharing the input device with the device that is last connected.

In this case, based on a principle similar to that of the embodiment corresponding to FIG. 6, in response to an operation of moving the mouse to the left side by the user, the laptop computer 200 can move the cursor located on the second interface 201 of the laptop computer 200 leftward to the interface that is displayed on the tablet computer 400 located on the left side of the laptop computer 200. In this way, the laptop computer 200 can have the function of sharing the input device, for example, the mouse, the keyboard, and the touchpad, with the tablet computer 400. In addition, based on a principle similar to that of the embodiment corresponding to FIG. 6, in response to an operation of moving the mouse to the right side by the user, the laptop computer 200 can alternatively move the cursor located on the second interface 201 of the laptop computer 200 rightward to the interface that is displayed on the mobile phone 100 located on the right side of the laptop computer 200. In this way, the laptop computer 200 can have the function of sharing the input device, for example, the mouse, the keyboard, and the touchpad, with the tablet computer 400.

For example, it can be seen from the embodiment corresponding to (c) in FIG. 15 that the icon 203 of the mobile phone 100 is located on the right side of the icon 209 of the laptop computer 200, and the icon 204 of the tablet computer 400 is located on the left side of the icon 209 of the laptop computer 200.

Figure 16:
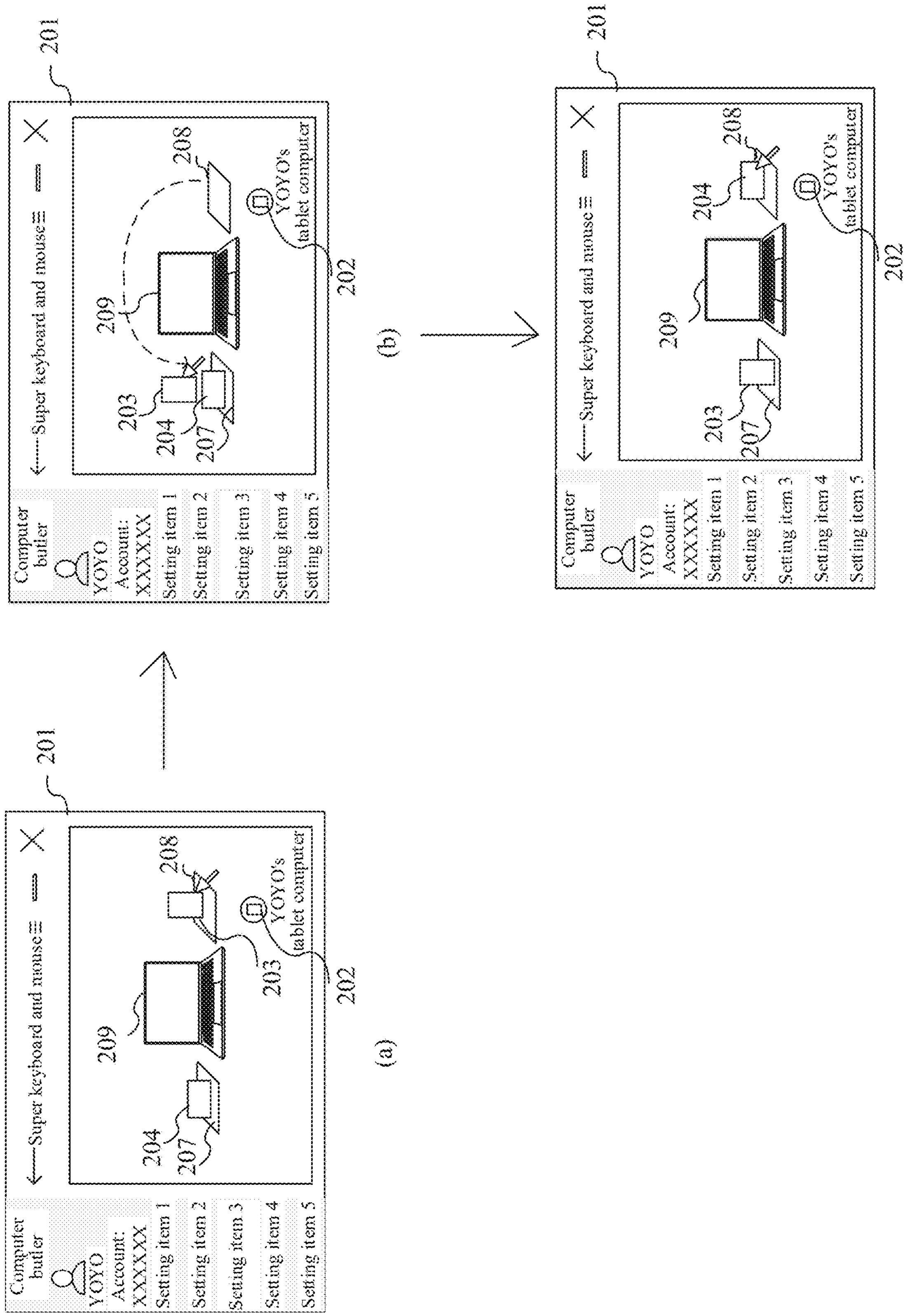
FIG. 16 is a schematic interface diagram in which a laptop computer 200 switches a position of an icon 204 of a tablet computer 400 with a position of an icon 203 of a mobile phone in response to an operation of a user according to an embodiment of this application.

In this case, if the mobile phone 100 is located on the left side of the laptop computer 200, when the tablet computer 400 is located on the right side of the laptop computer 200, as shown in (a) in FIG. 16, the laptop computer 200 can alternatively move the icon 203 of the mobile phone 100 to the left side of the icon 209 of the laptop computer 200 in response to an operation of moving the icon 203 of the mobile phone 100 to the left side of the icon 209 of the laptop computer 200 by the user. As shown in (b) and (c) in FIG. 16, after the icon 203 of the mobile phone 100 is moved to the left side of the icon 209 of the laptop computer 200, the user raises the hand to stop touching the touchpad, or releases the left button of the mouse (that is, stops the moving operation). In this case, the laptop computer 200 detects that the moving operation on the icon 203 of the mobile phone 100 is stopped, and the laptop computer 200 displays the icon 203 of the mobile phone 100 in the first subarea 207 on the left side of the icon 209 of the laptop computer 200. The laptop computer 200 displays the icon 204 of the tablet computer 400 in the second subarea 208 on the right side of the icon 209 of the laptop computer 200. In this way, the laptop computer 200 can adjust a direction of an icon of a device, so that a direction of a position of the icon of the device relative to the icon 209 of the laptop computer 200 is the same as that of a position of the device relative to the laptop computer 200.

In this way, when the laptop computer 200 and the tablet computer 400 enter the preset mode, in response to an operation of moving the cursor leftward by the user, the laptop computer 200 can accurately control the cursor to move to the interface displayed on the mobile phone 100. Alternatively, in response to an operation of moving the cursor rightward by the user, the laptop computer 200 can accurately control the cursor to move to the interface displayed on the tablet computer 400. In other words, the user moves the cursor on the interface of the laptop computer based on an actual position of the mobile phone or the tablet computer relative to the laptop computer, to move the cursor to the interface of the mobile phone or the laptop computer, so as to implement input control on the mobile phone or the laptop computer by using the input device of the laptop computer.

It should be noted that, in the foregoing embodiments, how the laptop computer 200 establishes a short-range communication connection with a device in response to an operation of the user is described. The following describes how the laptop computer 200 disconnects a short-range communication connection with a device in response to an operation of the user.

Manner 1 for disconnecting the short-range communication connection: The laptop computer 200 can move an icon of the device out of the first subarea 207 or the second subarea 208 in response to an operation of moving the icon of the device out of the first subarea 207 or the second subarea 208 (namely, a fourth operation). Further, after the user raises a hand to stop touching a touchpad, or releases a left button of the mouse (that is, stops the moving operation), the short-range communication connection with the device that is associated with the moved icon of the device is disconnected. After the communication connection between the device and the laptop computer 200 is disconnected, the icon and identity information of the disconnected device are displayed on the lower side of the laptop computer 200, and the icon and the identity information of the disconnected device are located at a position at which the device is located before the connection is established with the laptop computer 200.

Figure 17:
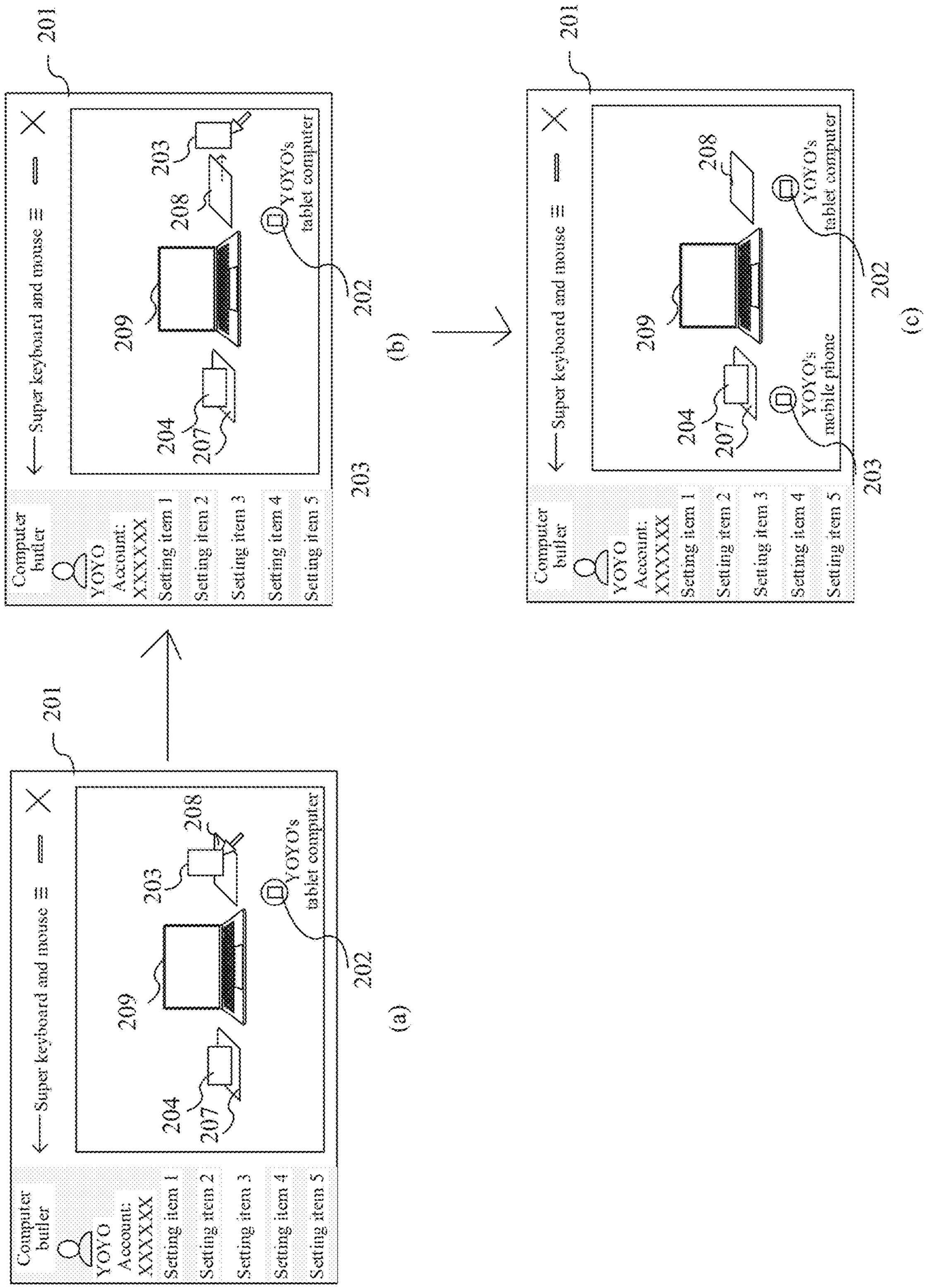
FIG. 17 is a schematic interface diagram in which a laptop computer 200 moves an icon 203 of a mobile phone out of a second subarea 208 in response to an operation on the icon 203 of the mobile phone according to an embodiment of this application.

For example, on the basis of the embodiment corresponding to FIG. 15, as shown in (a) in FIG. 17, the laptop computer moves the icon 203 of the mobile phone 100 out of the second subarea 208 (namely, the fourth operation) in response to a moving operation on the icon 203 of the mobile phone 100. As shown in (b) in FIG. 17, when the laptop computer 200 detects that the moving operation on the icon 203 of the mobile phone 100 is stopped (for example, the user raises the hand to stop touching the touchpad, or releases the left button of the mouse), if the icon 203 of the mobile phone 100 is not in the first subarea 207 or the second subarea 208, the short-range communication connection between the laptop computer 200 and the mobile phone 100 is disconnected. Further, as shown in (c) in FIG. 17, the icon 203 and the identity information of the mobile phone 100 are displayed on the lower side of the icon 209 of the laptop computer 200, and the icon and the identity information of the disconnected device are located at the position at which the device is located before the connection is established with the laptop computer 200, to prompt the user that the mobile phone 100 successfully disconnects the short-range communication connection with the laptop computer 200.

Manner 2 for disconnecting the short-range communication connection: When an icon of the device is displayed in the first subarea 207 or the second subarea 208, the icon of the device may also carry a delete control (namely, a third control). In response to a click operation on the delete control (namely, the fourth operation), the laptop computer 200 can disconnect the short-range communication connection with the device that is associated with the icon of the device whose delete control is clicked. After the communication connection between the device and the laptop computer 200 is disconnected, the icon and identity information of the disconnected device are displayed on the lower side of the laptop computer 200. Optionally, the laptop computer 200 may alternatively cancel displaying the delete control in response to a press and hold operation or a moving operation of the user on the icon of the device carrying the delete control.

Figure 18:
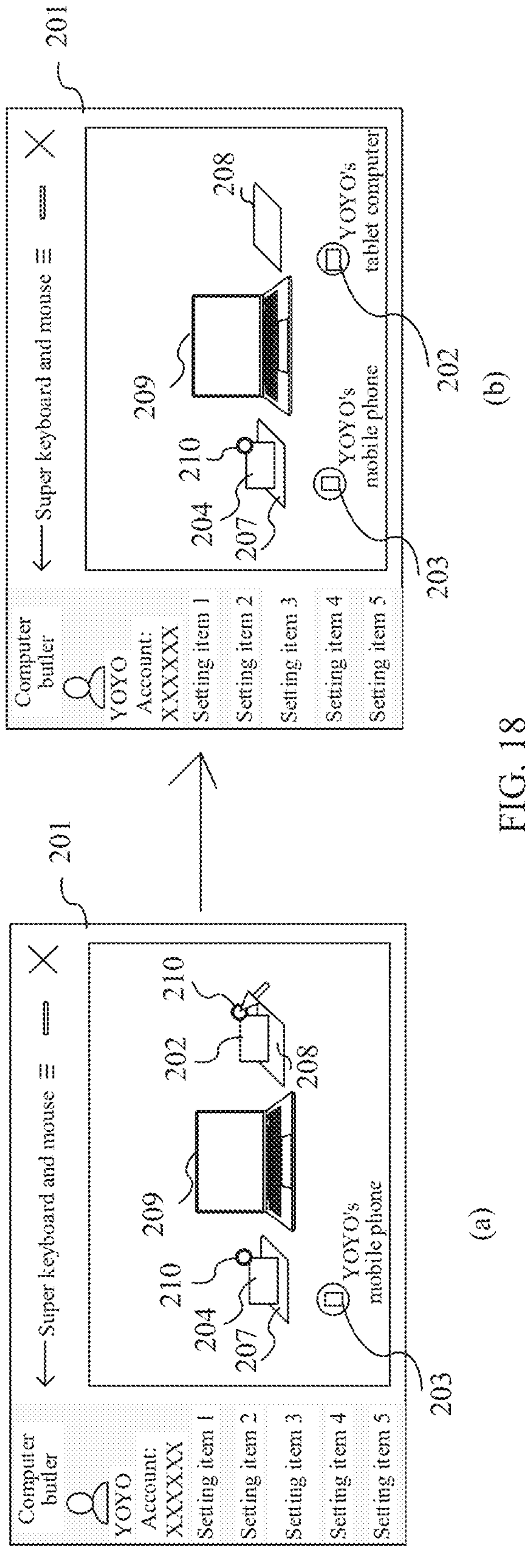
FIG. 18 is a schematic interface diagram in which a laptop computer 200 moves an icon 203 of a mobile phone out of a second subarea 208 in response to a click operation on a deletion control 210 on the icon 203 of the mobile phone according to an embodiment of this application.

For example, on the basis of the embodiment corresponding to FIG. 15, as shown in (a) and (b) in FIG. 18, the laptop computer disconnects the short-range communication connection with the mobile phone 100 in response to a click operation on a delete control 210 on the icon 203 of the mobile phone 100. Further, as shown in (c) in FIG. 17, the icon 203 and the identity information of the mobile phone 100 are displayed on the lower side of the icon 209 of the laptop computer 200, to prompt the user that the mobile phone 100 successfully disconnects the short-range communication connection with the laptop computer 200.

It should be noted that, based on the two manners for disconnecting the short-range communication connection, in some embodiments, when the icon and the identity information of the mobile phone 100 are displayed on the lower side of the icon 209 of the laptop computer 200, a position of the icon of the mobile phone 100 on an X axis relative to the icon 209 of the laptop computer 200 may be the same as a position of the mobile phone 100 on the X axis relative to the laptop computer 200. In some other embodiments, the position of the icon 203 of the mobile phone 100 may alternatively located at a position at which the mobile phone 100 is located before the short-range connection is established with the laptop computer 200. This is not limited herein.

It should be noted that, the embodiments corresponding to FIG. 5 to FIG. 18 are described by using an example in which the icons of the three discovered devices are displayed on the lower side of the icon 209 of the laptop computer 200 on the second interface 201. When the laptop computer 200 discovers more devices, because a size of space of the second interface 201 is limited, icons of all the discovered devices cannot be displayed at once. Therefore, when a quantity of devices discovered by the laptop computer 200 is greater than a first quantity, the laptop computer 200 selects a first quantity of devices from the discovered devices, and displays icons and identity information of the first quantity of selected devices on the lower side of the icon 209 of the laptop computer 200. In this way, when the user pays more attention to the icons of the first quantity of devices, the icons of the first quantity of devices are more preferentially displayed on the second interface, so that the user can easily browse and operate the icons of the first quantity of devices.

For example, in some embodiments, when a preset threshold is 5, and the laptop computer 200 discovers a device 1, a device 2, a device 3, a device 4, a device 5, a device 6, a device 7, and a device 8, for a total of eight devices, the laptop computer 200 may determine five devices form the eight discovered devices. A strategy for determining the five devices may be: randomly selecting five devices, or selecting the first five devices that is discovered in an earlier time sequence, or when a quantity of devices that have been connected in the eight devices is greater than or equal to 5, selecting five devices from the devices that have been connected. When a quantity of devices that have been connected in the eight discovered devices is less than 5, all devices that have been connected are included in the five determined devices. The five devices determined by the laptop computer 200 are a first group of devices whose icons and identity information need to be displayed.

Further, the laptop computer 200 may display the icons and the identity information of the five selected devices on the lower side of the icon 209 of the laptop computer 200 on the second interface 201.

Figure 19:
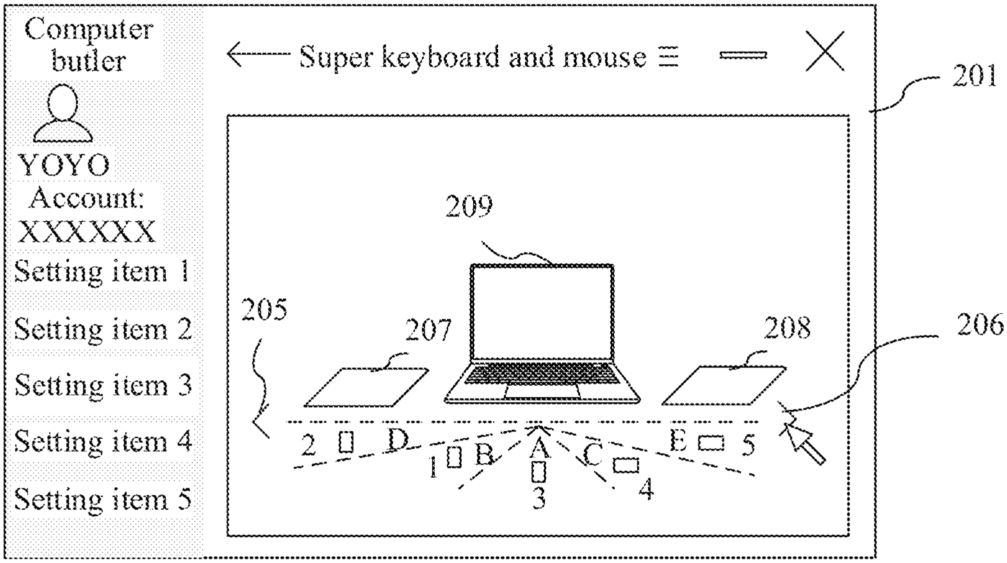
FIG. 19 is a schematic interface diagram 1 in which a laptop computer 200 displays icons of discovered devices according to an embodiment of this application.

In some embodiments, as shown in FIG. 19, the lower side of the icon 209 of the laptop computer 200 is divided into a third subarea A, a third subarea B, a third subarea C, a third subarea D, and a third subarea E, each third subarea is used to display an icon and identity information of a device. A sequence of the third subarea A, the third subarea B, the third subarea C, the third subarea D, and the third subarea E from left to right is: the third subarea D, the third subarea B, the third subarea A, the third subarea C, and the third subarea E. The third subarea D and the third subarea B are located on the left side of the icon 209 of the laptop computer 200, and the third subarea C and the third subarea E are located on the right side of the icon 209 of the laptop computer 200. Priorities of the third subareas are a priority of the third subarea A>a priority of the third subarea B>a priority of the third subarea C>a priority of the third subarea D>a priority of the third subarea E, and priorities of the devices are a priority of device 1>a priority of device 2>a priority of device 3>a priority of device 4>a priority of device 5. Certainly, the priorities of the third subareas may alternatively be in another priority arrangement, and the priorities of the devices may alternatively be in another priority arrangement. Here is only an example for description.

The priority of each device may be determined by a moment at which each device is last connected to the laptop computer 200. A priority of a device that is last connected to the laptop computer 200 at a latest moment is higher. Alternatively, the priority of each device may be determined by a quantity of times each device is connected to the laptop computer 200. A priority of a device that is connected to the laptop computer 200 the most times is higher. It should be understood that a device that is last connected to the laptop computer 200 at an earliest moment or a device that is connected to the laptop computer 200 the most times is a device to which the user pays more attention. In this way, positions of the devices are sorted based on the determined priorities. This is more convenient for the user to operate.

In this way, the laptop computer 200 may determine an arrangement manner of the icons and the identity information of the devices based on a direction of each device relative to the laptop computer 200, a direction of each third subarea relative to the icon 209 of the laptop computer 200, the priority of each device, and the priority of each third subarea. In this way, a second identifier of a device with a higher priority can be arranged at a position that is more convenient for the user to browse and operate.

For example, when the device 1, the device 2, the device 3, the device 4, and the device 5 are all located on the left side of the laptop computer 200, the laptop computer 200 determines the third subarea D and third subarea B that are located on the left side of the icon of the laptop computer 200. Further, the laptop computer 200 determines that the priority of the third subarea B is higher than the priority of the third subarea D, and the priority of the device 1 is the highest. Therefore, the laptop computer 200 displays an icon and identity information of the device 1 in the third subarea B, and displays an icon and identity information of the device 2 whose priority is second to the priority of the device 1, in the third subarea D. The third subarea A is located on the lower side of the icon 209 of the laptop computer, and the third subarea C and the third subarea E are located on the right side of the icon 209 of the laptop computer 200. Therefore, the laptop computer 200 determines that the priority of the third subarea A is the highest in the third subareas in which no icon and no identity information of the device is displayed, and that the priority of the device 3 is the highest in the devices whose icons and identity information are not displayed. In this case, the laptop computer 200 displays an icon and identity information of the device 3 in the third subarea A. Based on a similar principle, the laptop computer 200 may also display an icon and identity information of the device 4 in the third subarea C, and an icon and identity information of the device 5 in the third subarea E.

In the foregoing embodiment, how to display the icon and the identity information of each device is described by using an example in which the device 1, the device 2, the device 3, the device 4, and the device 5 are all located on the left side of the laptop computer 200. In some other embodiments, when the device 1, the device 2, the device 3, the device 4, and the device 5 are all located on the right side of the laptop computer 200, or the device 1, the device 2, the device 3, the device 4, and the device 5 are separately located on the two sides of the laptop computer 200, a principle of displaying the icon and the identity information of each device is similar to a principle of displaying the icon and the identity information of each device when all devices are located on the left side of the laptop computer 200. This is not limited herein.

In some other embodiments, the laptop computer 200 may alternatively determine an arrangement manner of the icons and the identity information of the devices based on the priority of each device and the priority of each third subarea. In this way, a second identifier of a device with a higher priority can be arranged at a position that is more convenient for the user to browse and operate.

Figure 20:
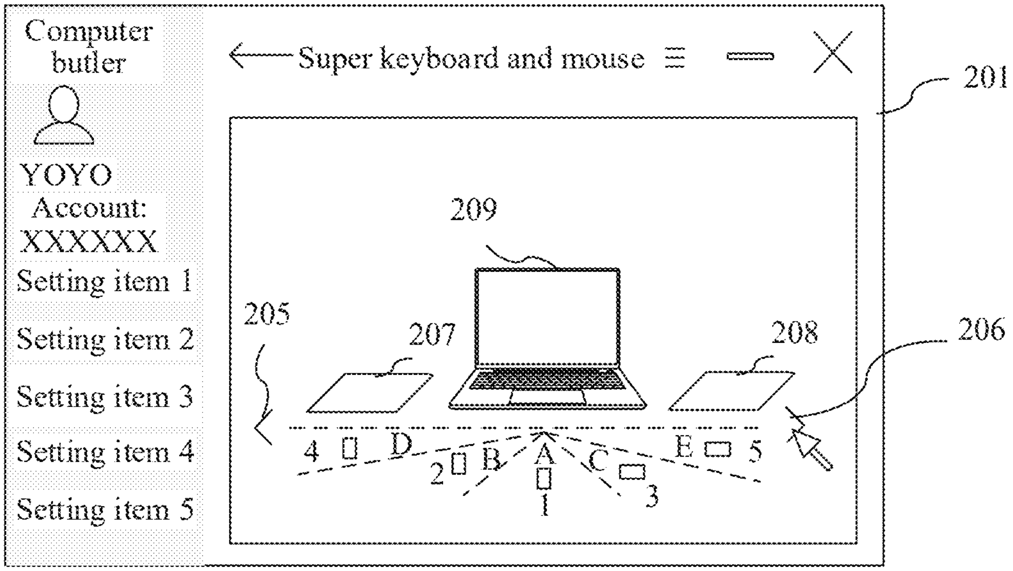
FIG. 20 is a schematic interface diagram 2 in which a laptop computer 200 displays icons of discovered devices according to an embodiment of this application.

As shown in FIG. 20, when the laptop computer 200 determines that the priority of the third subarea A is the highest, and that the priority of the device 1 is the highest, the icon and the identity information of the device 1 are displayed in the third subarea A. Based on a similar principle, the laptop computer 200 displays the icon and the identity information of the device 2 in the third subarea B, the laptop computer 200 displays the icon and the identity information of the device 3 in the third subarea C, the laptop computer 200 displays the icon and the identity information of the device 4 in the third subarea D, and the laptop computer 200 displays the icon and the identity information of the device 5 in the third subarea E.

In some other embodiments, the laptop computer 200 may alternatively determine an arrangement manner of the icons and the identity information of the devices based on a direction of each device relative to the laptop computer 200. In (a) of FIG. 21, an arrangement manner of the icons of the device 1, the device 2, the device 3, the device 4, and the device 5 from left to right is: the device 4, the device 2, the device 1, the device 3, and the device 5. In addition, in (a) in FIG. 21, the left side of the second interface 201 may include a control 205 that is used to indicate display icons and identity information of a previous group of devices, and the right side of the second interface 201 may include a control 206 (namely, the second control) that is used to indicate display icons and identity information of a next group of devices. In (a) in FIG. 21, the left side of the second interface 201 may include a control 205 that is used to indicate display icons and identity information of a previous group of devices, or the control 205 is not displayed. This is not limited herein.

The laptop computer 200 determines that a quantity of devices whose icons and identity information are not displayed is less than 5 in response to a click operation on the control 206. Further, on the basis of the embodiment corresponding to (a) in FIG. 21, as shown in (b) in FIG. 21, the laptop computer 200 updates display content on the lower side of the icon 209 of the laptop computer 200 on the second interface 201 to a device 6, a device 7, and a device 8 whose icons and identity information are not displayed, so that the user can browse the next group of devices that have been discovered. In addition, in some other embodiments, the control 206 on the second interface 201 may not be displayed when the laptop computer 200 displays the device 6, the device 7, and the device 8.

Similarly, an arrangement manner of the icons and the identity information of the device 6, the device 7, and the device 8 is: a manner of distributing the devices based on positions in the X axis that are recognized by the laptop computer 200. As shown in (b) in FIG. 21, the arrangement manner of the icons and the identity information of the device 6, the device 7, and the device 8 is: the device 7, the device 6, and the device 8.

Figure 21:
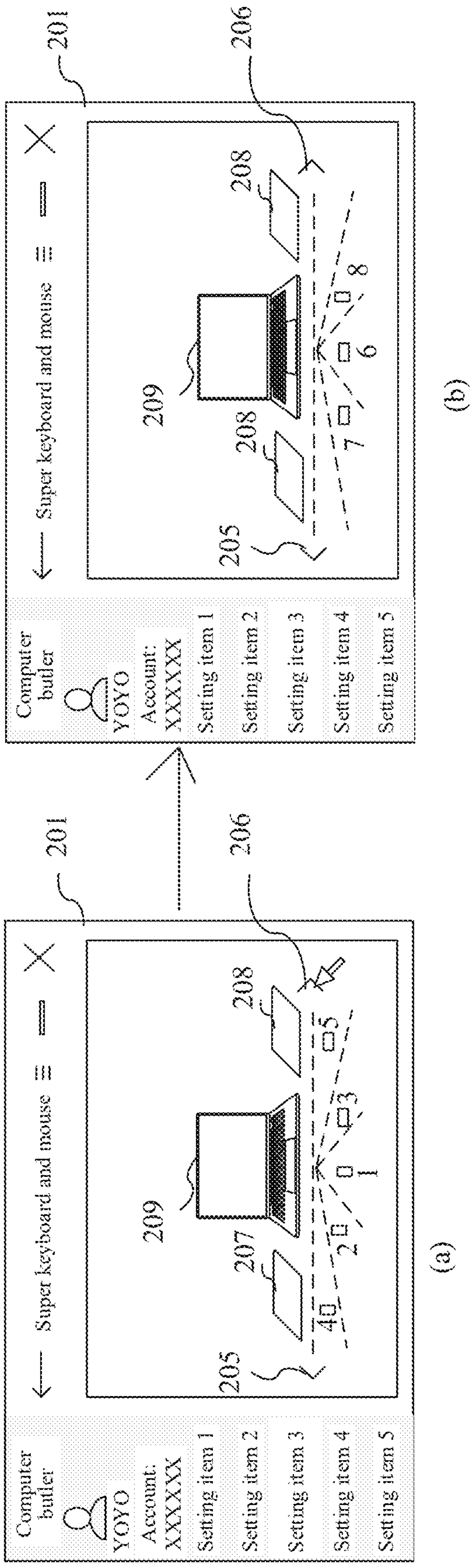
FIG. 21 is a schematic interface diagram 3 in which a laptop computer 200 displays icons of discovered devices according to an embodiment of this application.

Still as shown in (b) in FIG. 21, the left side of the second interface 201 may include the control 205 that is used to indicate display the icons and the identity information of the previous group of devices. The laptop computer 200 displays the icons and the identity information of the device 1, the device 2, the device 3, the device 4, and the device 5 in response to a click operation on the control 205 (not shown in the figure). That is, the laptop computer 200 displays the icons and the identity information of the previous group of devices in response to a click operation on the control 205 (not shown in the figure). This also allows the user to return to and browse the previous group of devices that have been discovered.

In addition, based on the respective embodiments corresponding to FIG. 19 to FIG. 21, when determining that the quantity of devices whose icons and identity information are not displayed is greater than 5 in response to a click operation on the control 206, the laptop computer 200 re-determines five devices from the devices whose icons and identity information are not displayed. A manner for re-determining the five devices is same as the manner for determining the device in the foregoing embodiments. Details are not described herein. Further, the laptop computer 200 updates the display content on the lower side of the icon 209 of the laptop computer 200 on the second interface 201 to the icons and the identity information of the five re-determined devices (not shown in the figure).

It should be noted that, The foregoing embodiments are described by using an example in which the laptop computer 200 displays an icon of a device, with which a connection is established, in the first subarea 207 on the left side of the icon 209 of the laptop computer 200 or in the second subarea 208 on the right side of the icon 209 of the laptop computer 200 after establishing a connection with a discovered device. In some other embodiments, after the laptop computer establishes a connection with a discovered device, or after the user drags an icon of a device to the first subarea or the second subarea, the laptop computer 200 may alternatively display a desktop of a device, with which a connection is established, in the first subarea 207 on the left side of the icon 209 of the laptop computer 200 or in the second subarea 208 on the right side of the icon 209 of the laptop computer 200 (that is, a display state of an identifier of the second terminal located in the second area is different from a display state of an identifier of the second terminal located in the first subarea 207 or the second subarea 208, which is not shown in the figure). This is not limited herein. In this way, the user can further distinguish whether the device establishes a short-range communication connection with the first terminal based on a display state of an identifier of the device more clearly.

Further, When the laptop computer 200 responds to an operation of moving the desktop of the device out of the first subarea 207 or the second subarea 208 (namely, the fourth operation) by the user, the laptop computer 200 updates the desktop of the device in the first subarea 207 or the second subarea 208 to the icon of the device (not shown in the figure). In addition, after disconnecting the connection with the discovered device, the laptop computer 200 cancels displaying the desktop of the device, with which the connection is established, in the first subarea 207 or the second subarea 208, and displays the icon of the disconnected device on the lower side of the icon 209 of the laptop computer 200, and the icon of the disconnected device is located at a position at which the device is located before the connection is established with the laptop computer 200.

It should be noted that, in the foregoing embodiments, how the laptop computer 200 shares the input device with the mobile phone 100 and the tablet computer 300 is described by using an example in which the mobile phone 100 and the tablet computer 300 display text input interfaces. In some other embodiments, the laptop computer 200 may alternatively share, based on a similar principle, the input device with the mobile phone 100 or the tablet computer 300 displaying gaming interfaces. This is not described herein again.

Figure 22:
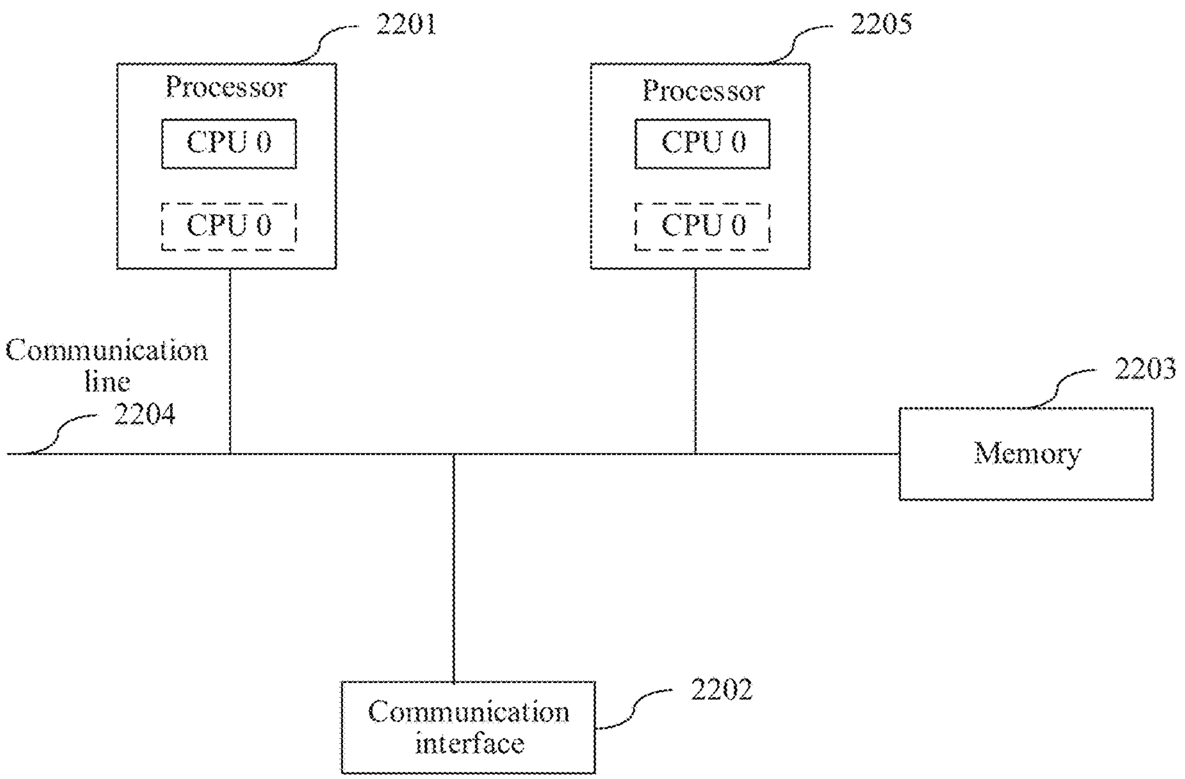
FIG. 22 is a schematic diagram of a hardware structure of a terminal device according to an embodiment of the present application.

For example, FIG. 22 is a schematic diagram of a hardware structure of a terminal device according to an embodiment of this application. As shown in FIG. 22, the terminal device includes a processor 2201, a communication line 2204, and at least one communication interface (in FIG. 22, a communication interface 2203 is used as an example for description).

The processor 2201 may be a general-purpose central processing unit (CPU), a microprocessor, an application-specific integrated circuit (ASIC), or one or more integrated circuits configured to control execution of a program in the solutions of this application.

The communication line 2204 may include a circuit configured to transmit information between the foregoing components.

The communication interface 2203 uses any apparatus of a transceiver type to communicate with another device or a communication network, for example, an Ethernet, wireless local area networks (WLANs), and the like.

Possibly, the terminal device may further include a memory 2202.

The memory 2202 may be a read-only memory (ROM), another type of static storage device that can store static information and instructions, a random access memory (RAM), or another type of dynamic storage device that can store information and instructions, or may be an electrically erasable programmable read-only memory (EEPROM) or a compact disc read-only memory (CD-ROM) or another compact disc storage, optical disc storage (including compressed optical discs, laser discs, optical discs, digital versatile optical discs, and Blu-ray discs), a magnetic disk storage medium, or another magnetic storage device, or any another medium that can be used to carry or store desired program code in the form of an instruction or a data structure and that can be accessed by a computer, but not limited thereto. The memory may exist independently, and is connected to the processor through the communication line 2204. The memory may alternatively be integrated with the processor.

The memory 2202 is configured to store computer executable instructions for performing the solutions of this application, and is controlled and executed by the processor 2201. The processor 2201 is configured to execute the computer executable instructions stored in the memory 2202, to implement the method performed by the first terminal or the second terminal according to embodiments of this application.

Possibly, the computer executable instructions in embodiments of this application may also be referred to as application code. This is not specifically limited in embodiments of this application.

During specific implementation, in an embodiment, the processor 2201 may include one or more CPUs, for example, a CPU 0 and a CPU 1 in FIG. 22.

During specific implementation, in an embodiment, the terminal device may include one or more processors, for example, a processor 2201 and a processor 2205 in FIG. 22. Each of these processors may be a single-core (single-CPU) processor, or may be a multi-core (multi-CPU) processor. The processor herein may be one or more devices or circuits, and/or a processing core configured to process data (for example, computer program instructions).

Figure 23:
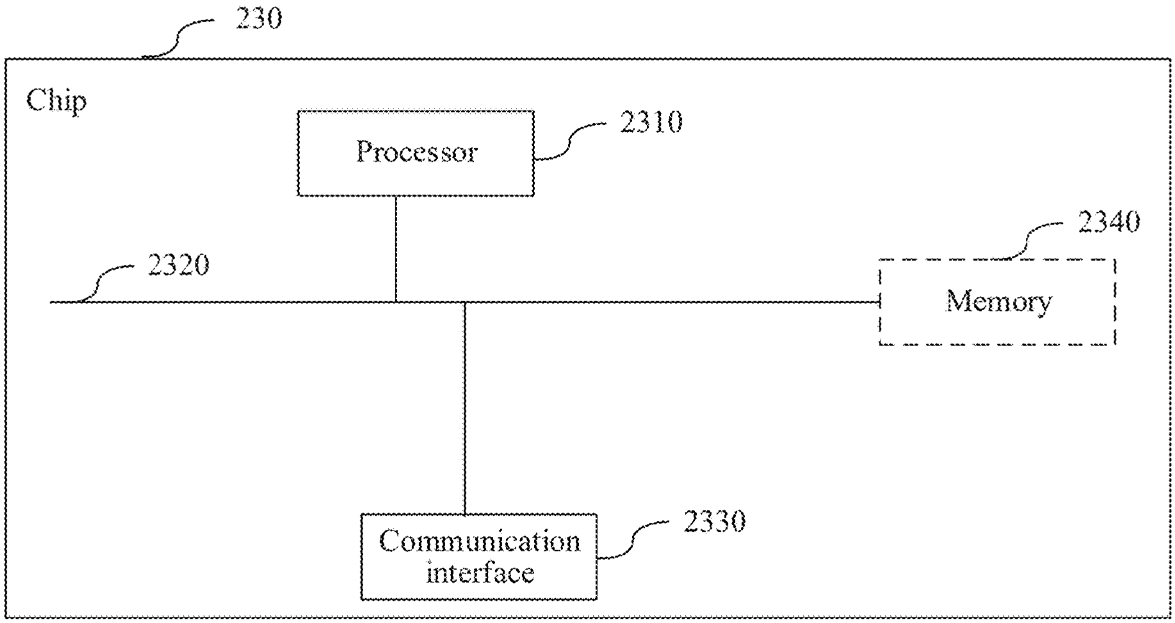
FIG. 23 is a structural schematic diagram of a chip according to an embodiment of this application.

For example, FIG. 23 is a schematic diagram of a structure of a chip according to an embodiment of this application. A chip 230 includes one or more than two (including two) processors 2310 and a communication interface 2330.

In some implementations, the memory 2340 stores the following element: an executable module, or a data structure, or a subset thereof, or an extension set thereof.

In embodiments of this application, the memory 2340 may include a read-only memory and a random access memory, and provide instructions and data to the processor 2310. A part of the memory 2340 may further include a non-volatile random access memory (NVRAM).

In embodiments of this application, the memory 2340, the communication interface 2330, and the memory 2340 are coupled together by a bus system 2320. In addition to a data bus, the bus system 2320 may further include a power bus, a control bus, a status signal bus, and the like. For ease of description, all types of buses in FIG. 23 are marked as the bus system 2320.

The method described in embodiments of this application may be applied to the processor 2310 or implemented by the processor 2310. The processor 2310 may be an integrated circuit chip with a signal processing capability. In an implementation process, steps in the foregoing methods can be implemented by using a hardware integrated logical circuit in the processor 2310, or by using instructions in a form of software. The processor 2310 may be a general-purpose processor (for example, a microprocessor or a conventional processor), a digital signal processor (DSP), an application specific integrated circuit (ASIC), a field-programmable gate array (FPGA), another programmable logic device, a discrete gate, a transistor logic device, or a discrete hardware component. The processor 2310 may implement or perform the methods, steps, and logical block diagrams disclosed in embodiments of the present disclosure.

The steps of the methods disclosed with reference to embodiments of this application may be directly performed and completed by using a hardware decoding processor, or may be performed and completed by using a combination of hardware and software modules in the decoding processor. The software module may be located in a mature storage medium in the field such as a random access memory, a read-only memory, a programmable read-only memory, an electrically erasable programmable memory (EEPROM), or a register. The storage medium is located in the memory 2340, and the processor 2310 reads information in the memory 2340, and completes the steps in the foregoing methods in combination with hardware thereof.

In the foregoing embodiment, the instructions executed by the processor stored in the memory may be implemented in the form of a computer program product. The computer program product may be pre-written in the memory, or may be downloaded and installed in the memory in the form of software.

The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, including one or more usable media. The usable medium may include a magnetic medium (for example, a floppy disk, a hard disk, or a magnetic tape), an optical medium (for example, a digital versatile disc (DVD)), a semi-conductive medium (for example, a solid state disk (SSD)), or the like.

An embodiment of this application further provides a computer-readable storage medium. All or some of methods in the foregoing embodiments may be implemented by using software, hardware, firmware, or any combination thereof. The computer-readable medium may include a computer storage medium and a communication medium, and may further include any medium that can transmit a computer program from one place to another. The storage medium may be any target medium accessible to a computer.

In a possible design, the computer-readable storage medium may include a compact disc read-only memory (CD-ROM), a RAM, a ROM, an EEPROM, or another optical disc memory. The computer-readable medium may include a magnetic disk memory or another magnetic disk storage device. Any connection line may also be appropriately referred to as a computer readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc (e.g., a CD), a laser disc, a digital versatile disc (DVD), a floppy disk, and a Blu-ray disc, wherein the magnetic disk generally reproduces data in a magnetic manner, and the optical disc reproduces data optically by using laser.

The foregoing combination should also be included in the scope of the computer-readable medium. The foregoing is only a specific implementation of this application, but the scope of protection of this application is not limited to this. Any technical personnel familiar with the technical field can easily think of a change or replacement within the technical scope disclosed in this application shall be covered by the protection scope of this application. Therefore, the protection scope of this application shall be subject to the protection scope of the claims.

The invention claimed is:

1. A device connection establishment method, applied to a first terminal and a second terminal, wherein the first terminal is connected with an input device configured for entering a control instruction, and the method comprises:

displaying, by the first terminal, a first window, wherein the first window is a first interface of a first application, and the first interface comprises a first control;

in response to a trigger operation on the first control, performing device discovery, and displaying a second interface in the first window by the first terminal, wherein the second interface comprises a first identifier of the first terminal, a first area is around the first identifier of the first terminal, and second identifiers of discovered devices are displayed in a second area around the first identifier of the first terminal;

in response to a first operation on an identifier of the second terminal in the second identifiers, establishing a short-range communication connection with the second terminal, and moving the identifier of the second terminal from the second area to the first area by the first terminal;

entering, by the first terminal and the second terminal, a preset mode, and in the preset mode, moving, by the first terminal in response to a second operation of a user, a cursor corresponding to the input device to an interface of the second terminal; and in response to receiving a third operation of the user on the input device, performing, by the second terminal, a function corresponding to the third operation;

wherein a quantity of the discovered devices is greater than a first quantity, and displaying the second identifiers of the discovered devices in the second area around the first identifier of the first terminal comprises:

based on the quantity of discovered devices being greater than the first quantity. selecting, by the first terminal, the first quantity of devices from the discovered devices; and displaying second identifiers of the first quantity of selected devices in the second area around the first identifier of the first terminal.

2. The method according to claim 1, wherein the first area comprises a first subarea and a second subarea, the first subarea is located on a first side of the first identifier, the second subarea is located on a second side of the first identifier, and the moving the identifier of the second terminal from the second area to the first area comprises:

moving the identifier of the second terminal from the second area to the first subarea or the second subarea.

3. The method according to claim 2, wherein the moving the identifier of the second terminal from the second area to the first subarea or the second subarea comprises:

based on recognizing that the second terminal is located on a second side of the first terminal, moving, by the first terminal, the identifier of the second terminal from the second area to the second subarea;

wherein the second operation is an operation of moving the cursor corresponding to the input device to a second edge of an interface of the first terminal by the user.

4. The method according to claim 2, wherein the moving the identifier of the second terminal from the second area to the first subarea or the second subarea comprises:

based on recognizing that the second terminal is located on a first side of the first terminal, moving, by the first terminal, the identifier of the second terminal from the second area to the first subarea;

wherein the second operation is an operation of moving the cursor corresponding to the input device to a first edge of an interface of the first terminal by the user.

5. The method according to claim 4, wherein after the moving, by the first terminal in response to the second operation of the user, the cursor corresponding to the input device to the interface of the second terminal, the method further comprises:

moving, by the first terminal, the identifier of the second terminal in response to an operation of moving the identifier of the second terminal to the second side;

displaying, by the first terminal, the identifier of the second terminal in the second subarea based on detecting that the second terminal moves to the second side; and moving, by the first terminal, the cursor to the interface of the second terminal in response to the operation of moving the cursor corresponding to the input device to the second edge of the interface of the first terminal by the user.

6. The method according to claim 4, wherein after the moving, by the first terminal in response to the second operation of the user, the cursor corresponding to the input device to the interface of the second terminal, the method further comprises:

moving, by the first terminal, an identifier of a third terminal in response to an operation of moving the identifier of the third terminal in the second identifiers to a direction of the first side;

establishing, by the first terminal, a short-range communication connection with the third terminal based on detecting that the identifier of the third terminal is moved to the first side;

displaying, by the first terminal, the identifier of the third terminal in the first subarea, and moving the identifier of the second terminal to the second subarea for display; and moving, by the first terminal, the cursor to an interface of the third terminal in response to the operation of moving the cursor corresponding to the input device to the first edge of the interface of the first terminal by the user.

7. The method according to claim 6, wherein after the moving, by the first terminal, the cursor to the interface of the third terminal in response to the operation of moving the cursor corresponding to the input device to the first edge of the interface of the first terminal by the user, the method further comprises:

moving, by the first terminal, the identifier of the third terminal in response to an operation of moving the identifier of the third terminal to a direction of the second side;

based on detecting that the identifier of the third terminal is moved to the second side, displaying, by the first terminal, the identifier of the third terminal in the second subarea, and moving the identifier of the second terminal from the second subarea to the first subarea; and moving, by the first terminal, the cursor to the interface of the third terminal in response to the operation of moving the cursor corresponding to the input device to the second edge of the interface of the first terminal by the user.

8. The method according to claim 7, wherein after the moving, by the first terminal, the cursor to the interface of the third terminal in response to the operation of moving the cursor corresponding to the input device to the second edge of the interface of the first terminal by the user, the method further comprises:

in response to the first operation on an identifier of a fourth terminal in the second identifiers, based on the first terminal recognizing that the fourth terminal is located on the first side of the first terminal, disconnecting, by the first terminal, the short-range communication connection with the second terminal, and establishing a short-range communication connection with the fourth terminal;

moving, by the first terminal, the identifier of the second terminal from the first subarea to the second area, and moving the identifier of the fourth terminal from the second area to the first subarea; and moving, by the first terminal, the cursor to an interface of the fourth terminal in response to the operation of moving the cursor corresponding to the input device to the second edge of the interface of the first terminal by the user.

9. The method according to claim 2, wherein a display state of the identifier of the second terminal located in the second area is different from a display state of the identifier of the second terminal located in the first subarea or the second subarea.

10. The method according to claim 1, wherein displaying the second identifiers of the discovered devices in the second area around the first identifier of the first terminal comprises:

recognizing, by the first terminal, a direction of each discovered device relative to the first terminal; and displaying, by the first terminal, the second identifiers of the discovered devices in the second area around the first identifier of the first terminal, wherein a direction of each second identifier relative to the first identifier of the first terminal is the same as the direction of each device relative to the first terminal.

11. The method according to claim 10, wherein after the displaying, by the first terminal, the second identifiers of the discovered devices in the second area around the first identifier of the first terminal, the method further comprises:

based on the first terminal detecting a change of the direction of one of the devices relative to the first terminal, adjusting, by the first terminal, a position of the second identifier of one of the devices on the first interface, wherein a direction of the adjusted second identifier of one of the devices relative to the first identifier of the first terminal is the same as the direction of one of the devices relative to the first terminal.

12. The method according to claim 1, wherein an arrangement manner of the second identifiers of the discovered devices in the second area is:

random arrangement; or arrangement based on a priority of each device; or arrangement based on a priority of each third subarea, wherein the second area comprises a plurality of third subareas.

13. The method according to claim 1, selecting the first quantity of devices comprises:

randomly selecting the first quantity of devices from the discovered devices; or selecting the first quantity of devices that is discovered in an earlier time sequence from the discovered devices; or based on a quantity of devices that have been connected in the discovered devices being greater than or equal to the first quantity, selecting the first quantity of devices from the devices that have been connected.

14. The method according to claim 1, wherein the first interface further comprises a second control, the second control is used to indicate each of second identifiers of a next group of devices, and after the displaying second identifiers of the first quantity of selected devices in the second area around the first identifier of the first terminal, the method further comprises:

in response to a trigger operation on the second control, determining, by the first terminal, whether a quantity of second identifiers of unselected devices in the discovered device is less than the first quantity;

based on the quantity of unselected devices being greater than the first quantity, reselecting, by the first terminal, the first quantity of devices from the unselected devices, and displaying second identifiers of the first quantity of reselected devices in the second area around the first identifier of the first terminal; and based on the quantity of unselected devices being less than or equal to the first quantity, displaying, by the first terminal, the second identifiers of the unselected devices in the second area of the first terminal around the first identifier of the first terminal.

15. The method according to claim 1, wherein after the moving the identifier of the second terminal from the second area to the first area, the method further comprises:

in response to a fourth operation on the identifier of the second terminal located in the first area, moving, by the first terminal, the identifier of the second terminal from the first area to the second area for display; and disconnecting, by the first terminal, the short-range communication connection with the second terminal.

16. The method according to claim 15, wherein:

the fourth operation is an operation of moving the identifier of the second terminal out of the first area; or the fourth operation is a click operation on the identifier of the second terminal located in the first area; or the identifier of the second terminal carries a third control, and the fourth operation is a click operation on the third control.

17. The method according to claim 1, wherein the input device is a keyboard, a mouse, or a touchpad.

18. A device connection establishment method, applied to a first terminal and a second terminal, wherein the first terminal is connected with an input device configured for entering a control instruction, and the method comprises:

displaying, by the first terminal, a first window, wherein the first window is a first interface of a first application, and the first interface comprises a first control;

in response to a trigger operation on the first control, performing device discovery, and displaying a second interface in the first window by the first terminal, wherein the second interface comprises a first identifier of the first terminal, a first area is around the first identifier of the first terminal, and second identifiers of discovered devices are displayed in a second area around the first identifier of the first terminal;

in response to a first operation on an identifier of the second terminal in the second identifiers, establishing a short-range communication connection with the second terminal, and moving the identifier of the second terminal from the second area to the first area by the first terminal;

entering, by the first terminal and the second terminal, a preset mode, and in the preset mode, moving, by the first terminal in response to a second operation of a user, a cursor corresponding to the input device to an interface of the second terminal; and in response to receiving a third operation of the user on the input device, performing, by the second terminal, a function corresponding to the third operation;

wherein the second area comprises a plurality of third subareas, and displaying the second identifiers of the discovered devices in the second area around the first identifier of the first terminal comprises:

recognizing, by the first terminal, a direction of each discovered device relative to the first terminal; and determining, by the first terminal, an arrangement manner of the second identifiers of the discovered devices based on the direction of each discovered device relative to the first terminal, a direction of each third subarea relative to the first identifier of the first terminal, a specified priority of each device, and a specified priority of each third subarea; and displaying, by the first terminal, the second identifiers of the discovered devices in the plurality of third subareas based on the determined arrangement manner of the second identifiers.

19. A system, comprising:

a first terminal; and a second terminal, wherein the first terminal is connected with an input device configured for entering a control instruction;

wherein the first terminal displays a first window, wherein the first window is a first interface of a first application, and the first interface comprises a first control;

wherein in response to a trigger operation on the first control, the first terminal performs device discovery and displays a second interface in the first window, wherein the second interface comprises a first identifier of the first terminal, a first area is around the first identifier of the first terminal, and second identifiers of discovered devices are displayed in a second area around the first identifier of the first terminal;

wherein in response to a first operation on an identifier of the second terminal in the second identifiers, the first terminal establishes a short-range communication connection with the second terminal, and moves the identifier of the second terminal from the second area to the first area;

wherein the first terminal and the second terminal enter a preset mode;

wherein in the preset mode, the first terminal moves, in response to a second operation of a user, a cursor corresponding to the input device to an interface of the second terminal;

wherein in response to a third operation of the user on the input device, the second terminal performs a function corresponding to the third operation; and wherein a quantity of the discovered devices is greater than a first quantity, and displaying the second identifiers of the discovered devices in the second area around the first identifier of the first terminal comprises:

based on the quantity of discovered devices being greater than the first quantity. selecting, by the first terminal, the first quantity of devices from the discovered devices; and displaying second identifiers of the first quantity of selected devices in the second area around the first identifier of the first terminal.

* * * * *